US012563232B2

(12) United States Patent (10) Patent No.: US 12,563,232 B2
Oh (45) Date of Patent: Feb. 24, 2026

(54) IMAGE FILE FORMAT FOR MULTIPLANE IMAGES

(71) Applicant: DOLBY LABORATORIES LICENSING CORPORATION

(72) Inventor: Sejin Oh, San Jose, CA (US)

(73) Assignee: DOLBY LABORATORIES LICENSING CORPORATION

( * ) Notice: Subject to any disclaimer, the term of this patent is extended or adjusted under 35 U.S.C. 154(b) by 0 days.

(21) Appl. No.: 18/917,891

(22) Filed: Oct. 16, 2024

(65) Prior Publication Data

US 2025/0056043 A1 Feb. 13, 2025

Related U.S. Application Data

(63) Continuation-in-part of application No. PCT/US2024/024133, filed on Apr. 11, 2024.

(60) Provisional application No. 63/621,455, filed on Jan. 16, 2024, provisional application No. 63/495,715, filed on Apr. 12, 2023.

(51) Int. Cl.
*H04N 19/597* (2014.01)
*H04N 19/136* (2014.01)
*H04N 19/70* (2014.01)

(52) U.S. Cl.
CPC ......... *H04N 19/597* (2014.11); *H04N 19/136* (2014.11); *H04N 19/70* (2014.11)

(58) Field of Classification Search
CPC .... H04N 19/597; H04N 19/70; H04N 19/136; H04N 21/8146; H04N 21/8153; H04N 21/8451; H04N 21/85406; G06T 9/00
See application file for complete search history.

(56) References Cited

U.S. PATENT DOCUMENTS

2022/0353486 A1* 11/2022 McCready .............. G06T 15/00
2024/0357181 A1 10/2024 Lu

FOREIGN PATENT DOCUMENTS

WO 2022069522 A1 4/2022

OTHER PUBLICATIONS

ISO/IEC 23008-12:2022, "ISO/IEC JTC 1/SC 29/WG 3Information technology—MPEG systems technologies"—Part 12: Image File Format, Sep. 2022, 151 Pages.
Fleureau, et al. "MIV CE1 related: activation of transparency attribute and application to MPI encoding", 132. MPEG Meeting; Oct. 12, 2020 to Oct. 16, 2020, Online Motion Picture Expert Group or ISO/IEC JTC1/ SC29/WG11, No. m55089, Oct. 6, 2020, 14 Pages.
Emre B Aksu (Nokia) et al: "On carriage of static V-PCC content", 126. MPEG Meeting; Mar. 25-Mar. 29, 2019; Geneva; (Motion Picture Expert Group or ISO/IEC JTC1/SC29/WG11), No. m47439. Mar. 26, 2019 , 3 Pages.
ISO/IEC 14496-12:2022, Information technology—Coding of audio-visual objects—Part 12: ISO base media file format, Edition 7, Jan. 2022, 15 Pages.

(Continued)

*Primary Examiner* — Kathleen V Nguyen

(57) ABSTRACT

Methods, systems, and bitstream syntax are described for a file container that supports the storage and transmission of multi-plane images. Examples are provided for coding texture and opacity information using HEVC or VVC coding and the HEIF container. Examples of carrying coded MPI images according to V3C and an example HEIF-based player are also presented.

12 Claims, 7 Drawing Sheets

(56) References Cited

OTHER PUBLICATIONS

ISO/IEC 23008-12:2022/AMD, 1:2022(E) Information technology—MPEG systems technologies—Part 12: Image File Format, 2022, 15 Pages.

ISO/IEC 23008-2:2023, ITU-T H.265, Information technology—High efficiency coding and media delivery in heterogeneous environments, Series H: Audiovisual and multimedia systems Infrastructure of audiovisual services—Coding of moving video ISO/IEC JTC 1/SC 29, Edition 5, Oct. 2023, 728 Pages.

Recommendation ITU-T T.35, Procedure for the allocation of ITU-T defined codes for non-standard facilities, International Telecommunications Union (CCIR) and (CCITT), Feb. 10, 2000, 15 Pages.

"Information technology—MPEG systems technologies—Part 12: Image File Format", ISO/IEC 23008-12:2022, IEC, 3, Rue De Varembe, Po Box 131, CH-1211 Geneva 20, Switzerland Sep. 29, 2022, pp. 1-119, 119 Pages.

* cited by examiner

CONSTITUENT PICTURE 0: MPI TEXTURE LAYERS KxM PACKING

CONSTITUENT PICTURE 1: MPI OPACITY LAYERS KxM PACKING

IMAGE FILE FORMAT FOR MULTIPLANE IMAGES

CROSS-REFERENCE TO RELATED APPLICATIONS

This application is a Continuation in Part (CIP) of PCT Application PCT/US2024/24133, filed on 11 Apr. 2024, which claims the benefit of priority from U.S. Provisional patent application 63/621,455, filed on 16 Jan. 2024, and U.S. Provisional patent application Ser. No. 63/495,715, filed on 12 Apr. 2023.

TECHNOLOGY

The present document relates generally to images and video. More particularly, an embodiment of the present invention relates to an imaging format for multi-plane images.

BACKGROUND

Multi-plane imaging (MPI) embodies a relatively new approach to storing volumetric content. MPI can be used to render both still images and video and represents a three-dimensional (3D) scene within a view frustum using, e.g., 8, 16, 32, or more planes of texture and transparency (or opacity) (alpha) information per camera. This representation stores parallel planes of a scene at a discretely sampled fixed range of depths from a reference coordinate frame. Information stored in each plane contains the texture (e.g., in terms of RGB values) and opacity (in terms of an alpha (A) channel). Example applications of MPI include computer vision and graphics, image editing, photo animation, robotics, and virtual reality.

The High Efficiency Image File Format (HEIF) (Ref. [1]) enables encapsulation of images and image sequences, as well as their associated metadata into a container file. HEIF is compatible with the ISO Base Media File Format (ISOBMFF) (Ref. [3]). HEIF includes the specification for encapsulating images and image sequences conforming to the High Efficiency Video Coding specification (HEVC, ISO/IEC 23008-2| ITU-T Rec. H.265). As appreciated by the inventor, a novel file format for representing MPI images using HEIF is described herein.

The term "metadata" herein relates to any auxiliary information transmitted either as part of the coded bitstream or along with it that assists a decoder to render or interpret one or more decoded images. While examples presented herein refer to the HEIF format, a person of ordinary skill would appreciate that the techniques discussed herein are applicable to any file container supporting the transmission of image and video content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
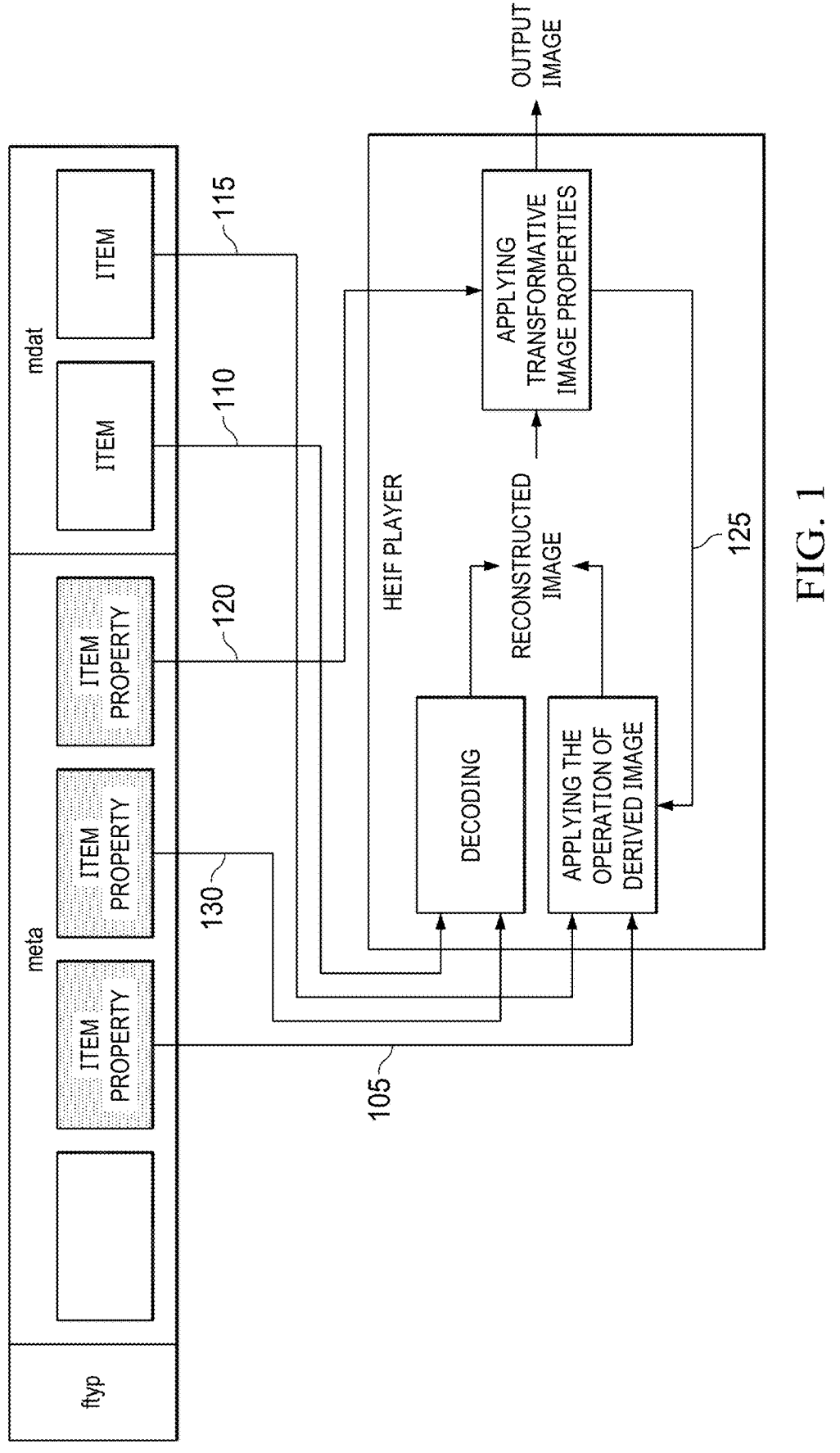
FIG. 1 depicts an example process for an HEIF player given an input HEIF file.

Example embodiments that relate to an imaging file format for MPI are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to an imaging file format for MPI. Embodiments discuss ways to extend the HEIF file format to support MPI images. The disclosure provides examples where MPI texture and opacity information may be coded as a single packed image or as two separate images, using both the HEVC and VVC codecs. An example embodiment for parsing and decoding an MPI image in HEIF is also provided. Examples of carrying MPI metadata according to the T.35 protocol and visual volumetric video-based coding (V3C), and example HEIF-based players that support these media representations are also presented.

High Efficiency Image File Format (HEIF)

The High Efficiency Image File Format (HEIF), (Ref. [1-2]) enables encapsulation of images and image sequences, as well as their associated metadata into a container file. HEIF is compatible with the ISO Base Media File Format) (Ref. [3]). HEIF includes the specification for encapsulating images and image sequences conforming to the High Efficiency Video Coding standard, also known as HEVC or H.265.

In ISOBMFF, a continuous or timed media or metadata stream forms a track, whereas static media or metadata is stored as items. Consequently, in HEIF, still images are stored as items. All image items are independently coded and do not depend on any other item in their decoding. Any number of image items can be included in the same file. Image sequences are stored as tracks. An image sequence track is used when there is coding dependency between images or when the playback of the images is timed. As opposed to video tracks, the timing in the image sequence track is advisory.

Table 1 describes the hierarchy of boxes in HEIF. The handler type for the MetaBox shall be 'pict' to indicate to a reader that this Meta box handles images. In HEIF, the item properties that can be used to describe image items or to affect the output image generation is stored, such as spatial extents, color information of image items.

TABLE 1

Hierarchy of boxes in HEIF

| Hierarchy of boxes | | | Box description |
|---|---|---|---|
| ftyp | | | File type and compatibility |
| meta | | | Metadata (a container for boxes that provide information about items) |
| | hdlr | | Handler, declares the metadata (handler) type. |
| | iloc | | Item location (locates items with offsets and length) |
| | iinf | | Item information (provides information about stored items) |
| | | infe | Item information entry |
| | pitm | | Primary item reference (indicates primary items which should be processed) |
| | iref | | Item references (indicates references that link items stored in the file) |
| | iprp | | Item properties (a container for item properties and association with items) |
| | | ipco | Container for item properties |
| | | ipma | Container for association of items and properties |
| | grpl | | Entity groups list |
| | idat | | Item data |
| mdat | | | Container for coded data bytes |

Table 2 illustrates an example of a single coded image item with its exchangeable image file format (Exif) metadata stored in HEIF. The file metadata for items is stored within a Meta box ('meta'). The handler type is set to 'pict,' indicating to a reader that this Meta box handles images. The coded image is stored as items of "hvc1", indicating HEVC coded data. The coded data for the image is contained either in a Media Data box ('mdat') or in an Item Data box ('idat'). The syntax of the 'hvc1' item consists of the network abstraction layer (NAL) units of an HEVC bitstream, and the bitstream contains exactly one access unit. All configuration information (e.g., parameter sets and information about the coding itself) required to initialize the decoder is stored as an item of type 'hvcC' (for HEVC-coded images). The width and height of the associated image is stored as an item of type 'ispe'. The association between items and property is indicated in ItemPropertyAssociationBox ("ipma"). Each property association may be marked as either essential or non-essential. A reader shall not process an item that is associated with a property that is not recognized or not supported by the reader and that is marked as essential to the item. A reader may ignore an associated item property that is marked non-essential to the item. Exif metadata for the image is optionally included in a file as an item of type "Exif" and linked to the image item using the 'cdsc' reference type in the Item Reference box ("iref").

TABLE 2

Example of HEVC image with Exif metadata in HEIF

FileTypeBox 'ftyp': major-brand='heic', compatible-brands='heic'
MetaBox 'meta':
  HandlerBox 'hdlr': 'pict'
  PrimaryItemBox 'pitm': item_ID=1;
  ItemInfoBox 'iinf': entry_count=2
    1) 'infe': item_ID=1, item_type='hvc1';
    1) 'infe': item_ID=2, item_type='Exif';

TABLE 2-continued

Example of HEVC image with Exif metadata in HEIF

ItemLocationBox 'iloc': item_count=2
    item_ID=1, extent_count=1, extent_offset=X, extent_length=Y;
    item_ID=2, extent_count=1, extent_offset=P, extent_length=Q;
  ItemReferenceBox 'iref':
    referenceType='cdsc', from_item_ID=2, ref_count=1,
to_item_ID=1;
  ItemPropertiesBox 'iprp':
    ItemPropertyContainerBox 'ipco':
      'hvcC' (decoder initialization configuration information)
      'ispe' (the width and height of the associated item)
    ItemPropertyAssociation 'ipma': entry_count=1
      1) item ID=1, association_count=2
        essential=1, property_index=1;
        essential=0, property_index=2;
MediaDataBox 'mdat' or 'idat':
  HEVC Image (at file offset X, with length Y)
  Exif data block (at file offset P, with length Q)

FIG. 1 illustrates an example process of how an HEIF-compatible player processes the coded images (110) and derived images (115) included in a file. The HEIF player decodes a coded image (110) into a reconstructed image using decoder configuration (130) information. Similarly, the HEIF player applies the derivation operation properties (105) of the derived image (115) to the indicated one or more input images to obtain the respective reconstructed image. The descriptive image properties generally describe the reconstructed image, with the exception of the decoder configuration and initialization information, which is associated with the coded image. The transformative image properties (120), if any, are applied to the reconstructed image to obtain an output image. The output image can be displayed when the coded image or the derived image is not a hidden image. The output image can also act as an input image (125) to derived images (115).

Multi-Plane Image (MPI) Scene Representation and Packing

A multiplane image comprises multiple image planes, with each of the image planes being a "snapshot" of the 3D scene at a certain depth with respect to the camera position. Information stored in each plane includes the texture information (e.g., represented by the R, G, B values) and transparency (or opacity) information (e.g., represented by the alpha (A) values). Herein, the acronyms R, G, B stand for red, green, and blue, respectively. In some examples, the three texture components can be (Y, Cb, Cr), or (I, Ct, Cp), or another functionally similar set of values. There are different ways in which a multiplane image can be generated. For example, two or more input images from two or more cameras located at different known viewpoints can be co-processed to generate a corresponding multiplane image. Alternatively, a multiplane image can be generated using a source image captured by a single camera.

Figure 2:
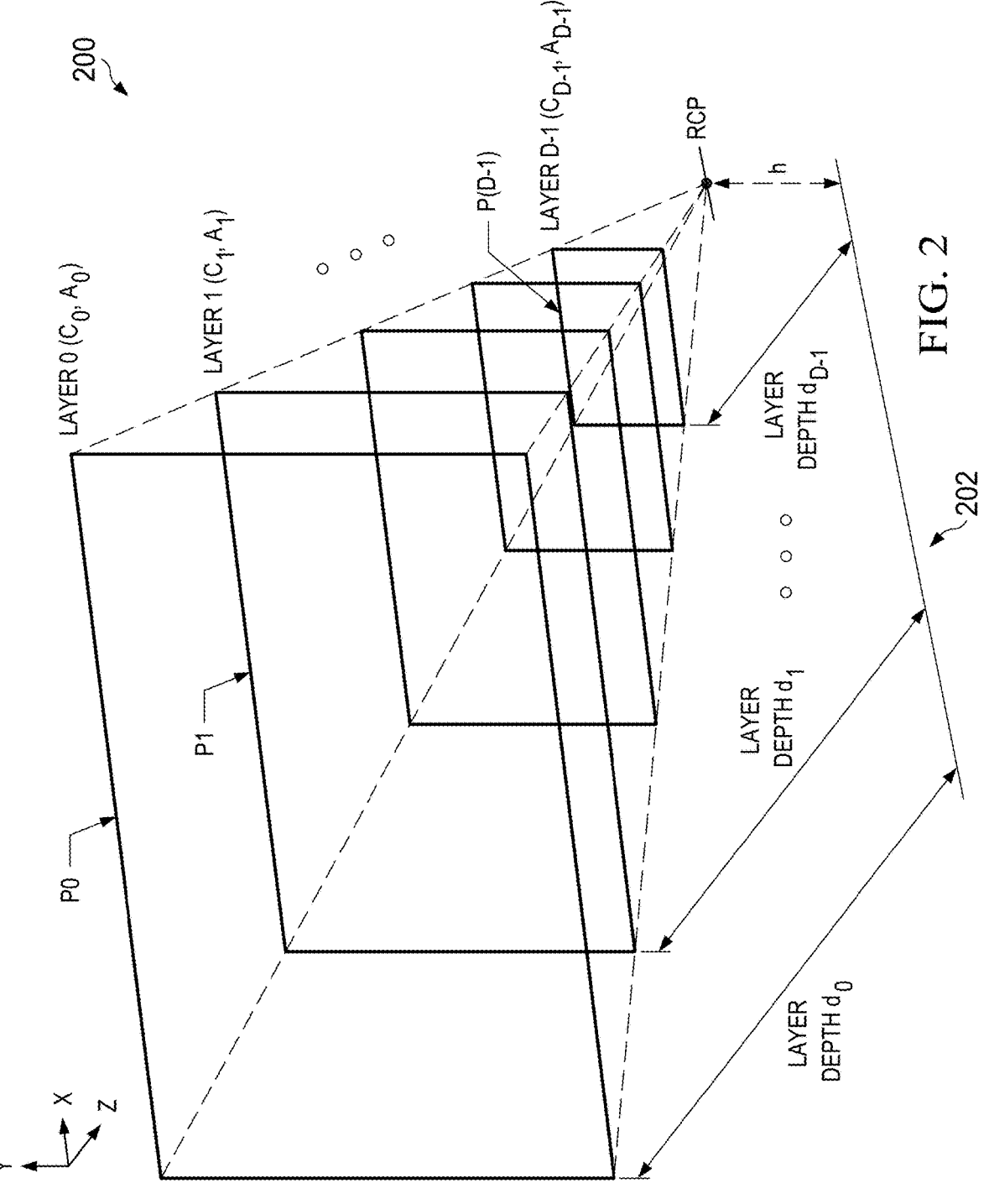
FIG. 2 depicts an example MPI representation using D layers of RGBA images for one camera view.

FIG. 2 pictorially illustrates a 3D scene representation using a multiplane image (200) according to an embodiment. The multiplane image (200) has D planes or layers (P0, P1, . . . , P(D−1)), where D is an integer greater than one. Typically, the planes (layers) are indexed such that the most remote layer, from the reference camera position (RCP), is indexed as the 0-th layer and is at a distance (or depth) do from the RCP along the Z dimension of the 3D scene. The index is incremented by one for each next layer located closer to the RCP. The plane (layer) that is the closest to the RCP has the index value (D−1) and is at a distance (or depth) $d_{D-1}$ from the RCP along the Z dimension. Each of the planes (P0, P1, . . . , P(D−1)) is orthogonal to a base plane (202) which is parallel to the XZ-coordinate plane. The RCP is at a vertical height h above the base plane (202). The XYZ triad shown in FIG. 2 indicates the general orientation of the multiplane image (200) and the planes (P0, P1, . . . , P(D−1)) with respect to the X, Y, and Z dimensions of the 3D scene. In various examples, the number D can be 32, 16, 8, or any other suitable integer greater than one.

Let us denote the color component (e.g., RGB) value for the i-th layer at camera location s as $C_i^{(s)}$, with the lateral size of the layer being H×W, where H is the height (Y dimension) and W is the width (X dimension) of the layer. The pixel value at location (x, y) for the color channel c is represented as $C_i^{(s)}(x, y, c)$. The a value for the i-th layer is $A_i^{(s)}$. The pixel value (x, y) in the alpha layer is represented as $A_i^{(s)}(x, y)$. The depth distance between the i-th layer to the reference camera position is di. The image from the original reference view (without the camera moving) is denoted as R, with the texture pixel value being $R^{(s)}(x, y, c)$. A still MPI image for the camera location s can therefore be represented as:

$$MPI(s) = \left\{ C_i^{(s)}(x, y, c), A_i^{(s)}(x, y) \right\}, i = 0, ..., D-1 \quad (1)$$

It is straightforward to extend this still MPI image representation to a video representation, provided that the camera position s is kept static overtime. This video representation is given by Eq. (2):

$$MPI(s, t) = \left\{ C_i^{(s)}(x, y, c, t), A_i^{(s)}(x, y, t) \right\}, i = 0, ..., D-1 \quad (2)$$

where t denotes time.

As already indicated above, a multiplane image, such as the multiplane image (200), can be generated from a single source image R or from two or more source images. Such generation may be performed, e.g., during a production phase. The corresponding MPI generation algorithm(s) may typically output the multiplane image (200) containing XYZ-resolved pixel values in the form {($C_i$, $A_i$), for i=0, . . . , D−1}.

By processing the multiplane image (200) represented by {($C_i$, $A_i$), for i=0, . . . , D−1}, an MPI-rendering algorithm can generate a viewable image corresponding to the RCP or to a new virtual camera position that is different from the RCP. An example MPI-rendering algorithm (often referred to as the "MPI viewer") that can be used for this purpose may include the steps of warping and compositing. Other suitable MPI viewers may also be used. The rendered multiplane image (200) can be viewed on a display.

Figure 3:
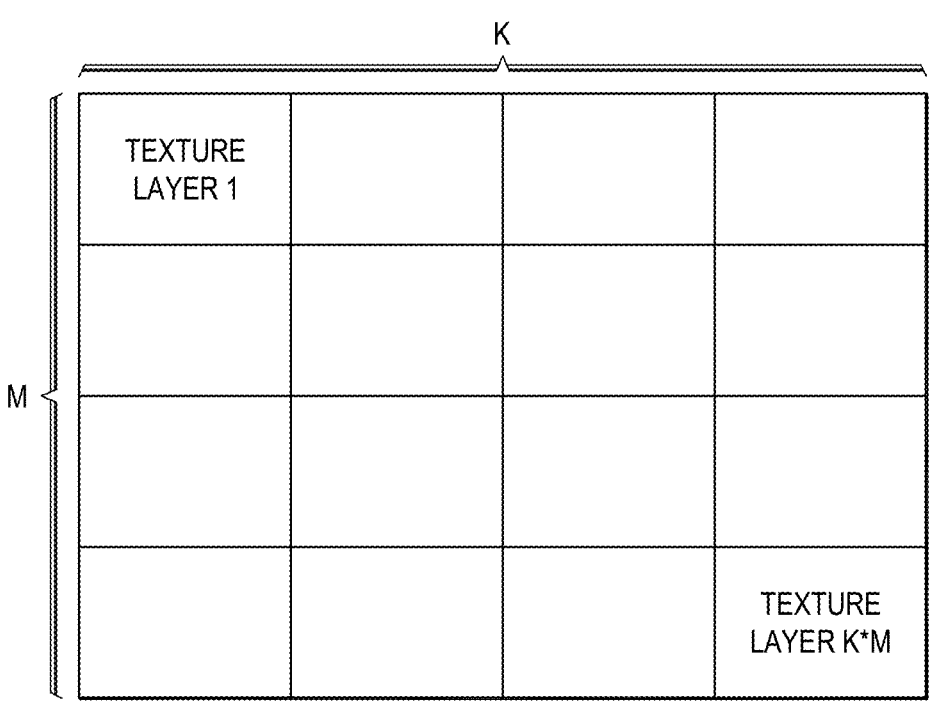
FIG. 3 depicts an example of spatial packing of K×M layers of an MPI image.

In an embodiment, given an MPI representation, the texture and opacity map of MPI layers are first spatially packed into an K×M arrangement to form constituent 2D pictures as depicted in FIG. 3. These two constituent pictures can be spatially packed into a same frame as side-by-side or top-and-bottom image or can be two separate texture and opacity map pictures.

Storage of an MPI Image in HEIF

In an example embodiment, the texture and opacity map of MPI layers are encoded by using a 2D video codec, such as HEVC (H.265) or Versatile Video Coding (VVC) (or H.266), and the coded images are stored as items in HEIF. To enable the player to restore the volumetric MPI representation from the decoded images, the following MPI metadata is also stored in HEIF.

The number of layers to be used in the MPI representation

Packing information describing how texture and opacity map of MPI layers are packed into pictures The depth information of MPI layers MPI post-processing specific information when it needs to be applied Extrinsic and intrinsic camera information (optionally)

These MPI metadata is stored as image item properties defined next.

Storage of MPI Metadata in Item Properties

In an embodiment, the MPIInformationProperty is used to describe MPI image items or to affect the output MPI image generation. The MPIInformationProperty describes the number of MPI layers, the depth of each layer, the texture and opacity map packing and arrangement information in decoded pictures.

The CameraExtrinsicMatrixProperty (specified in Ref. [2]) is optionally used to describe a position, in the cartesian representation, and an orientation of the camera that captures the associated image item. The CameraIntrinsicMatrixProperty is used to describe the characteristics of the camera that captures the associated image item.

| MPI Information Property Definition | |
|---|---|
| Box type: | 'mpii' |
| Property type: | Descriptive item property |
| Container: | ItemPropertyContainerBox |
| Mandatory (per item): | Yes |
| Quantity (per item): | One |

The MPIInformationProperty contains the MPI metadata of the associated image item. It includes the number of MPI layers, the depth of each layer, the texture and opacity map packing and arrangement information in pictures. In an embodiment, an example, with no limitation, syntax is given by:

---
Example Syntax
---

```
aligned (8) class MPIInformationProperty
extends ItemFullProperty ('mpii', version = 0, flags = 0) {
  unsigned int (8) mpii_num_layers_minus1;
  bit (4) reserved = 0;
  unsigned int (1) mpii_layer_packing_order;
  unsigned int (2) mpii_layer_packing_type;
  unsigned int (1) mpii_layer_depth_equal_distance_flag;
  unsigned int (8) mpii_picture_num_layers_in_height_minus1;
  unsigned int (8) mpii_picture_num_layers_in_width_minus1;
  if (mpii_layer_depth_equal_distance_flag) {
    depth_rep_info_element (ZnearSign, ZNearExp, ZNearMantissa,
ZNearManLen)
    depth_rep_info_element (ZFarSign, ZFarExp, ZFarMantissa,
ZFarManLen)
  }else
  for (i=0; i <= mpii_num_layer_minus1; i++ )
    depth_rep_info_element (ZSign [i], ZExp [i], ZMantissa [i],
ZManLen [i])
  }
}
class depth_rep_info_element(OutSign, OutExp, OutMantissa
OutManLen)
{
  unsigned int (1) da_sign_flag;
  unsigned int (7) da_exponent;
  unsigned int (5) da_mantissa_len_minus1;
  unsigned int (da_mantissa_len_minus1+1) da_mantissa;
```

The following semantics are defined:

mpii_num_layers_minus1 plus 1 specifies the number of texture and opacity layers for MPI representation.

mpii_layer_packing_order indicates the order of two constituent decoded pictures.

mpii_layer_packing_order equal 0 indicates the first decoded picture of constituent pictures is the texture map of MPI layers and the second picture is the opacity map of MPI layers.

mpii_layer_packing_order equal 1 indicates the first picture of constituent pictures is the opacity map of MPI layers and the second picture is the texture map of MPI layers.

mpii_layer_packing_type indicates the scheme of the packing arrangement of texture and opacity map of MPI layers in decoded pictures as defined in Table 3.

TABLE 3

| Packing types | |
|---|---|
| Value | Description |
| 0 | The decoded output pictures correspond to spatially packed constituent pictures in a top-bottom packing arrangement. |
| 1 | The decoded output pictures correspond to spatially packed constituent pictures in a side-by-side packing arrangement |
| 2 | The decoded output pictures correspond to two separate pictures. |

When mpii_layer_packing_order equal 0 and mpii_layer_packing_type equal 0 indicates the texture and opacity map packing is top-to-bottom. When mpii_layer_packing_order equal 0 and mpii_layer_packing_type equal 1 indicates the texture and opacity map packing is side-by-side. When mpii_layer_packing_order equal 0 and mpii_layer_packing_type equal 2 indicates two separate pictures, the first is texture map and the second is opacity are two separate images, one for texture and one for opacity.

mpii_pic_num_layers_in_height_minus1 plus 1 specifies the number of spatially packed layers in height for picture 0 and picture 1.

mpii_pic_num_layers_in_width_minus1 plus 1 specifies the number of spatially packed layers in width for picture 0 and picture 1. It is equal to (mpii_num_layers_minus1+1)/(mpii_pic_num_layers_in_height_minus1+1).

mpii_layer_depth_equal_distance_flag equal to 0 indicates the depth information for each layer is signalled followings. mpii_layer_depth_equal_distance_flag equal to 1 indicates the equal distance is used to generate MPI layers, the nearest depth and farthest depth are signaled, and depth information for each layer $Z [i]$ can be derive using nearest depth value (ZNear) and farthest depth value (ZFar).

— The depth value for $i-th$ MPI layer $Z[i] = =$ $$i * (ZFar - ZNear) / (mpi\_num\_layers\_minus1) + ZNear$$

The depth_rep_info_element(OutSign, OutExp, OutMantissa, OutManLen) syntax structure sets the values of the OutSign, OutExp, OutMantissa and OutManLen variables that represent a floating-point value.

da_sign_flag equal to 0 indicates that the sign of the floating-point value is positive.

da_sign_flag equal to 1 indicates that the sign is negative. The variable OutSign is set equal to da_sign_flag.

da_exponent specifies the exponent of the floating-point value. The value of da_exponent shall be in the range of 0 to 27-2, inclusive. The variable OutExp is set equal to da_exponent.

da_mantissa_len_minus1 plus 1 specifies the number of bits in the da_mantissa syntax element. The variable OutManLen is set equal to da_mantissa_len_minus1+1.

da_mantissa specifies the mantissa of the floating-point value. The variable OutMantissa is set equal to da_mantissa.

Note, without limitation, some of the MPI metadata syntax elements proposed herein may match the names of syntax elements proposed in Ref. [4] for transmitting MPI metadata via supplemental enhancement information (SEI) messaging. The proposed syntax parameters may be adapted to comply with other metadata formats.

Storage of MPI Metadata in Metadata Items

The XMP metadata is stored as an item of item_type value 'mime' and content type 'application/rdf+xml'. The body of the item is a valid XMP document containing the elements described earlier under "MPI Information Property," and the optional elements described in the CameraExtrinsicMatrixProperty (specified in Ref. [2]), in XML form.

The XMP metadata items are linked to the image items by item references of type 'cdsc'.

Table 4 provides an example of an XMP file describing metadata for an MPI scene with 16 MPI layers, using a side-by-side packing arrangement in a 4×4 configuration.

TABLE 4

Example of XMP metadata file for an MPI scene

```
<x:xmpmeta xmlns:x="adobe:ns:meta/" x:xmptk=
"Adobe XMP Core 5. 6-c111 79.158325, 2015/09/10-01:10:20">          5
    <rdf:RDF xmlns:rdf=http://www.w3.org/1999/02/22-rdf-syntax-ns#>
        <rdf:Description rdf : about=" "
            xmlns:MPI=http: /xxx.com/photos/1.0/mpi/
            xmlns:xmp=http://ns.adobe.com/xap/1.0/>
            <MPI:NumLayersMinus1>15</MPI:NumLayersMinus1>
            <MPI:LayerPackingOrder>0</MPI:LayerPackingOrder>           10
            <MPI:LayerPackingType>1</MPI:LayerPackingType>
<MPI:LayerDepthEqualDistanceFlag>True</MPI:
LayerDepthEqualDistanceFlag>
<MPI:PictureNumLayersInHeightMinus1>3</MPI:
PictureNumLayers InHeightMinus1>
<MPI:PictureNumLayersInWidthMinus1>3</MPI:                            15
PictureNumLayers InWidthMinus1>
            <MPI:DepthSign>0</MPI:DepthSign>
            <MPI:DepthExponent>10</MPI:DepthExponent>
```

Note that, <MPI: DepthSign>, <MPI: DepthExponent>, <MPI: DepthMantissa> correspond to parameters da_sign_flag, da_exponent, and da_mantissa, as defined earlier.

Storage of MPI data in ITU T.35

A T.35 metadata item carries an ITU-T T.35 message (Ref. [5]). When the T.35 metadata is stored as metadata item, then the item_type value is equal to 'it35'.

```
aligned (8) class T35Information {
    bit (8) itu_t_t35_country_code;
    if (itu_t_t35_country_code == 0xFF)
    {
        bit (8) itu_t_t35_country_code_extension_byte;
    }
    bit (8) itu_t_t35_payload [ ] ;
}
``` itu_t_t35_country_code is a byte having a value specified as a country code by Rec. ITU-T T.35 Annex A, or the country code extension value 0xFF.

itu_t_t35_country_code_extension_byte if present, is a byte having a value specified as a country code by Rec. ITU-T T.35 Annex B.

itu_t_t35_payload includes the payload containing data. The ITU-T T.35 terminal provider code and terminal provider oriented code is contained in the first one or more bytes of the itu_t_t35_payload, in the format specified by the Administration that issued the terminal provider code. Any remaining itu_t_t35_payload data is data having syntax and semantics as specified by the entity identified by the ITU-T T.35 country code, terminal provider code and terminal provider oriented code. itu_t_t35_payload contains either the elements described earlier or in the SEI message below. The length of this field is the number of bytes remaining in the item. An example MPI SEI message and its semantics are given below (see Ref. [4]).

|  | Descriptor |
|---|---|
| multiplane_image_information( payloadSize ) { |  |
| mpii_num_layers_minus1 | ue(v) |
| mpii_layer_depth_equal_distance_flag | u(1) |
| if( mpii_layer_depth_equal_distance_flag ) { |  |
| depth_rep_info_element( ZNearSign, ZNearExp, ZNearMantissa, ZNearManLen ) |  |
| depth_rep_info_element( ZFarSign, ZFarExp, ZFarMantissa, ZFarManLen ) |  |
| } else |  |
| for( i = 0; i <= mpii_num_layer_minus1; i++ ) |  |
| depth_rep_info_element( ZSign[ i ], ZExp[ i ], ZMantissa[ i ], ZManLen[ i ] ) |  |
| mpii_texture_opacity_interleave_flag | u(1) |
| if( mpii_texture_opacity_interleave_flag = = 0 ) |  |
| mpii_texture_opacity_arrangement_flag /* 0: Top-and-Bottom, 1: Side-by-Side */ | u(1) |
| mpii_picture_num_layers_in_height_minus1 | ue(v) |
| } |  |

TABLE 4-continued

Example of XMP metadata file for an MPI scene

```
            <MPI:DepthMantissa>1562</MPI:DepthMantissa>            40
            <MPI:DepthManLenMinus1>15</MPI:DepthManLenMinus1>
            <MPI:DepthSign>0</MPI : DepthSign>
            <MPI:DepthExponent>20</MPI:DepthExponent>
            <MPI:DepthMantissa>26482</MPI:DepthMantissa>
            <MPI:DepthManLen Minus1>15</MPI:DepthManLenMinus1>
        </ rdf:Description>                                        45
    </rdf:RDF>
</x:xmpmeta>
``` mpii_num_layers_minus1 plus 1 specifies the number of texture and opacity layers for the MPI representation.

mpii_layer_depth_equal_distance_flag equal to 1 indicates that equal distances are used to generate MPI layers and depth parameters for each layer.

mpii_texture_opacity_interleave_flag equal to 1 indicates decoded output pictures correspond to temporally interleaved texture and opacity constituent pictures in output order.

mpii_texture_opacity_interleave_flag equal to 0 indicates decoded output pictures correspond to spatially packed texture and opacity constituent pictures.

mpii_texture_opacity_arrangement_flag equal to 0 indicates decoded output pictures represent texture and opacity constituent pictures in a top-bottom packing arrangement.

mpii_texture_opacity_arrangement_flag equal to 1 indicates decoded output pictures represent texture and opacity constituent pictures in a side-by-side packing arrangement.

mpii_picture_num_layers_in_height_minus1 plus 1 specifies the number of spatially packed layers in height for picture 0 and picture 1.

A Packed Texture and Opacity Map Encapsulation in HEIF

This section describes a format to encapsulate a coded image of the packed texture and opacity map of MPI layers, and its associated MPI metadata, described earlier in "Storage of MPI metadata in item properties," in HEIF.

The spatially packed texture and opacity map of MPI layers is encoded by using 2D video codec, e.g., HEVC, VVC, and the like, and the coded image is stored as items.

2D video decoder configuration and initialization is stored in the decoder configuration properties and it sets as essential to require to be processed. When a particular supplemental enhancement information (SEI) message including MPI specific information is present in the bitstream (e.g., see Ref. [4]), the SEI message is carried in the decoder configuration properties. The MPI metadata is stored either in the MPI-InformationProperty (defined earlier in "Storage of MPI metadata in items properties") or as metadata items (defined earlier in "Storage of MPI metadata in metadata items").

Example Format to Encapsulate an HEVC-Coded MPI Image

This section describes an example format to encapsulate an HEVC-coded image which contains a spatially packed texture and opacity map of MPI layers in HEIF. The HEVC-coded image is stored as items of 'hvc1', indicating HEVC coded data. An HEVC image item of type 'hvc1' contains independently coded HEVC image of a spatially packed texture and opacity map of MPI layers in either top-bottom or side-by-side arrangement. An item of type 'hvc1' consists of the NAL units of the coded HEVC image bitstream containing exactly one access unit. All configuration information (e.g., parameter sets and information about the coding itself) required to initialize the decoder is stored as 'hvcC' property. Each HEVC image item of type 'hvc1' shall have an association with the 'hvcC' property. When MPI metadata is stored in the MPIInformationProperty, the HEVC image item of type 'hvc1' shall have an association to the MPIInformationProperty. essential shall be equal to 1 for an MPIInformationProperty. Optionally, the CameraExtrinsicMatrixProperty (specified in Ref. [2]) is present to describe a position, in the cartesian representation, and an orientation of the camera that captures the associated image item. The CameraIntrinsicMatrixProperty is present to describe the characteristics of the camera that captures the associated image item. When both are present, both are associated with the HEVC image item. Table 5 illustrates the encapsulation of a single HEVC coded image in HEIF. The HEVC-coded image is stored as items of 'hvc1'. The coded data for the image is contained either in a Media Data box ('mdat') or in an Item Data box ('idat') The width and height of the associated image is stored as an item property of type 'ispe'. The MPI metadata, the number of MPI layers, the depth of each layer, the texture and opacity map packing and arrangement in pictures, of the associated image is stored as an item property of type 'mpii'. The extrinsic and intrinsic camera information is store as an item property of type 'cmex' and 'cmin', respectively. The association between an image item and image properties is indicated in ItemPropertyAssociationBox ('ipma'). Since decoder configuration and MPI metadata shall be processed, the image properties of 'hvcC' and 'mpii' are marked as essential. A player shall not process an item that is associated with a property marked as essential that is not recognized or not supported.

TABLE 5

| Example of encapsulating a single HEVC-coded MPI image in HEIF |
| --- |
| FileTypeBox 'ftyp': major-brand='heic', compatible-brands='heic'<br>MetaBox 'meta':<br>  HandlerBox 'hdlr': 'pict'<br>  PrimaryItemBox 'pitm': item_ID=1;<br>  ItemInfoBox 'iinf': entry_count=1<br>    1) 'infe': item_ID=1, item_type='hvc1';<br>  ItemLocationBox 'iloc': item_count=1<br>    item_ID=1, extent_count=1, extent_offset=X, extent_length=Y;<br>  ItemPropertiesBox 'iprp': |

TABLE 5-continued

| Example of encapsulating a single HEVC-coded MPI image in HEIF |
| --- |
|   ItemPropertyContainerBox 'ipco':<br>    'hvcC'<br>    'ispe'<br>    'mpii'<br>    'cmex'<br>    'cmin'<br>  ItemPropertyAssociation 'ipma': entry_count=1<br>    1) item ID=1, association_count=5<br>      essential=1, property_index=1;<br>      essential=0, property_index=2;<br>      essential=1, property_index=3;<br>      essential=0, property_index=4;<br>      essential=0, property_index=5;<br>MediaDataBox 'mdat' or 'idat':<br>  HEVC Image (at file offset X, with length Y) |

When MPI metadata is stored in the XMP metadata items as an item of item_type value 'mime' and content type 'application/rdf+xml', as described earlier in "Storage of MPI metadata in metadata items", the XMP metadata items are linked to the image items by item references of type 'cdsc'. An HEIF file with a single coded image item and XMP metadata is structured as in Table 6:

TABLE 6

| Example of HEIF file with XMP metadata for HEVC-coded MPI |
| --- |
| FileTypeBox 'ftyp': major-brand='heic', compatible-brands='heic'<br>MetaBox 'meta':<br>  HandlerBox 'hdlr': 'pict'<br>  PrimaryItemBox 'pitm': item_ID=1;<br>  ItemInfoBox 'iinf': entry_count=2<br>    1) 'infe': item_ID=1, item_type='hvc1';<br>    1) 'infe': item_ID=2, item_type='mime';<br>  ItemLocationBox 'iloc': item_count=2<br>    item_ID=1, extent_count=1, extent_offset=X, extent_length=Y;<br>    item_ID=2, extent_count=1, extent_offset=P, extent_length=Q;<br>  ItemReferenceBox 'iref':<br>    referenceTypee='cdsc', from_item_ID=2, ref_count=1,<br>to_item_ID=1;<br>  ItemPropertiesBox 'iprp':<br>    ItemPropertyContainerBox 'ipco':<br>      'hvcC'<br>      'ispe'<br>    ItemPropertyAssociation 'ipma': entry_count=1<br>      1) item ID=1, association_count=2<br>        essential=1, property_index=1;<br>        essential=0, property_index=2;<br>MediaDataBox 'mdat' or 'idat':<br>  HEVC Image (at file offset X, with length Y)<br>XMP data (at file offset P, with length Q) |

When MPI metadata is stored in the T.35 metadata item as an item of item_type value 'it35', as described earlier, the T.35 metadata item is linked to the image items by item references of type 'cdsc'. An HEIF file with a single coded image item and T.35 metadata item is structured as follows:

FileTypeBox 'ftyp': major-brand='heic', compatible-brands='heic'
MetaBox 'meta':
  HandlerBox 'hdlr': 'pict'
  PrimaryItemBox 'pitm': item_ID=1;
  ItemInfoBox 'iinf': entry_count=2
    1) 'infe': item_ID=1, item_type='hvc1';
    1) 'infe': item_ID=2, item_type='it35';
  ItemLocationBox 'iloc': item_count=2
    item_ID=1, extent_count=1, extent_offset=X, extent_length=Y;
    item_ID=2, extent_count=1, extent_offset=P, extent_length=Q;

-continued

```
ItemReferenceBox 'iref':
    referenceTypee='cdsc', from_item_ID=2, ref_count=1,
to_item_ID=1;
    ItemPropertiesBox 'iprp':
        ItemPropertyContainerBox 'ipco':
            'hvcC'
            'ispe'
        ItemPropertyAssociation 'ipma': entry_count=1
            1) item ID=1, association_count=2
                essential=1, property_index=1;
                essential=0, property_index=2;
MediaDataBox 'mdat' or 'idat':
    HEVC Image (at file offset X, with length Y)
T.35 data (at file offset P, with length Q)
```

Example Format to Encapsulate a VVC-Coded MPI Image with MPI Metadata

This section describes an example format to encapsulate a VVC-coded image which contains a spatially packed texture and opacity map of MPI layers in HEIF.

The VVC-coded image is stored as items of 'vvc1', indicating VVC coded data. An VVC image item of type 'vvc1' contains independently coded VVC image of a spatially packed texture and opacity map of MPI layers in either top-bottom or side-by-side arrangement. An item of type 'vvc1' consists of the NAL units of the coded VVC image bitstream containing an entire VVC access unit. All VVC decoder configuration information (e.g., parameter sets and information about the coding itself) required to initialize the decoder is stored as 'vvcC' property. Each VVC image item of type 'vvc1' shall have an association with the 'vvcC' property.

When MPI metadata is stored in the MPIInformation-Property, each VVC image item of type 'vvc1' shall have an association to the MPIInformationProperty. essential shall be equal to 1 for an MPIInformationProperty associated with an image item of type 'vvc1'.

Optionally, the CameraExtrinsicMatrixProperty and the CameraIntrinsicMatrixProperty is present to describe the characteristics of the camera that captures the associated image item. When both are present, essential is equal to 0.

Table 7 illustrates the encapsulation of a single VVC coded image in HEIF. The VVC-coded image is stored as items of 'vvc1'. The MPI metadata is stored as an item property of type 'mpii'. The extrinsic and intrinsic camera information is store as an item property of type 'cmex' and 'cmin', respectively. The association between an VVC image item and image properties is indicated in ItemProp-ertyAssociationBox ('ipma'). Since decoder configuration and MPI metadata shall be processed, the image properties of 'hvcC' and 'mpii' marked as essential. A player shall not process an item that is associated with a property marked as essential that is not recognized or not supported.

TABLE 7

Example of encapsulating a single VVC-coded MPI in HEIF

```
FileTypeBox 'ftyp': major-brand='vvic', compatible-brands='vvic'
MetaBox 'meta':
    HandlerBox 'hdlr': 'pict'
    PrimaryItemBox 'pitm': item_ID=1;
    ItemInfoBox 'iinf': entry_count=1
        1) 'infe': item_ID=1, item_type='vvc1';
    ItemLocationBox 'iloc': item_count=1
        item_ID=1, extent_count=1, extent_offset=X, extent_length=Y;
```

TABLE 7-continued

Example of encapsulating a single VVC-coded MPI in HEIF

```
ItemPropertiesBox 'iprp':
    ItemPropertyContainerBox 'ipco':
        'vvcC'
        'ispe'
        'mpii'
        'cmex'
        'cmin'
    ItemPropertyAssociation 'ipma': entry_count=1
        1) item ID=1, association_count=5
            essential=1, property_index=1;
            essential=0, property_index=2;
            essential=1, property_index=3;
            essential=0, property_index=4;
            essential=0, property_index=5;
MediaDataBox 'mdat' or 'idat':
    VVC Image (at file offset X, with length Y)
```

When MPI metadata is stored in the XMP metadata items as an item of item_type value 'mime' and content type 'application/rdf+xml', as described earlier in "Storage of MPI metadata in metadata items," the XMP metadata items are linked to the image items by item references of type 'cdsc'. An HEIF file with a single VVC coded image item and XMP metadata is structured as in Table 8.

TABLE 8

Example of HEIF file with XMP metadata for VVC-coded MPI

```
FileTypeBox 'ftyp': major-brand='vvic', compatible-brands='vvic'
MetaBox 'meta':
    HandlerBox 'hdlr': 'pict'
    PrimaryItemBox 'pitm': item_ID=1;
    ItemInfoBox 'iinf': entry_count=2
        1) 'infe': item_ID=1, item_type='vvc1';
        1) 'infe': item_ID=2, item_type='mime';
    ItemLocationBox 'iloc': item_count=2
        item_ID=1, extent_count=1, extent_offset=X, extent_length=Y;
        item_ID=2, extent_count=1, extent_offset=P, extent_length=Q;
    ItemReferenceBox 'iref':
        referenceType='cdsc', from_item_ID=2, ref_count=1,
to_item_ID=1;
    ItemPropertiesBox 'iprp':
        ItemPropertyContainerBox 'ipco':
            'vvcC'
            'ispe'
        ItemPropertyAssociation 'ipma': entry_count=1
            1) item ID=1, association_count=2
                essential=1, property_index=1;
                essential=0, property_index=2;
MediaDataBox 'mdat' or 'idat':
    VVC Image (at file offset X, with length Y)
XMP data (at file offset P, with length Q)
```

When MPI metadata is stored in the T.35 metadata item as an item of item_type value 'it35', as described earlier, the T.35 metadata item is linked to the image items by item references of type 'cdsc'. An HEIF file with a single coded image item and T.35 metadata item is structured as follows:

```
FileTypeBox 'ftyp': major-brand='heic', compatible-brands='heic'
MetaBox 'meta':
    HandlerBox 'hdlr': 'pict'
    PrimaryItemBox 'pitm': item_ID=1;
    ItemInfoBox 'iinf': entry_count=2
        1) 'infe': item_ID=1, item_type='vvc1';
        1) 'infe': item_ID=2, item_type='it35';
    ItemLocationBox 'iloc': item_count=2
        item_ID=1, extent_count=1, extent_offset=X, extent_length=Y;
        item_ID=2, extent_count=1, extent_offset=P, extent_length=Q;
```

-continued

```
    ItemReferenceBox 'iref':
        referenceType='cdsc', from_item_ID=2, ref_count=1,
to_item_ID=1;
    ItemPropertiesBox 'iprp':
        ItemPropertyContainerBox 'ipco':
            'hvcC'
            'ispe'
        ItemPropertyAssociation 'ipma': entry_count=1
            1) item ID=1, association_count=2
                essential=1, property_index=1;
                essential=0, property_index=2;
MediaDataBox 'mdat' or 'idat':
    VVC Image (at file offset X, with length Y)
T.35 data (at file offset P, with length Q)
```

Example Encapsulation in HEIF Using Separate Texture and Opacity Images

From an MPI representation, two pictures of texture and opacity map can be generated as described in FIG. 3. This section describes a format to encapsulate two coded images of the texture and opacity map of MPI layers, and its associated MPI metadata, as described earlier in "Storage of MPI metadata in items properties," in HEIF.

Two separate texture and opacity map of MPI layers are encoded by using 2D video codec, e.g., HEVC, VVC, and the like, independently, and the coded images are stored as items. The texture map is stored as a master image and the opacity map is stored as an auxiliary image indicating it contains the alpha plane for the master image. The auxiliary image and the master image are linked using an item reference of 'aux1' from the auxiliary image to the master image. The auxiliary image of the opacity map is associated with an AuxiliaryTypeProperty (specified in Ref. [1]) identifying the type of the auxiliary image as alpha plane.

As described earlier in "A packed texture and opacity map encapsulation in HEIF," the decoder configuration and initialization is stored in the decoder configuration properties and it is marked as essential to require to be processed. When a particular SEI message including MPI specific information is present in the bitstream, the SEI message is carried in the decoder configuration properties. The MPI metadata is stored either in the MPIInformationProperty or metadata items defined earlier.

Example Format to Encapsulate Two HEVC-Coded MPI-Related Images

This section describes a format to encapsulate two HEVC-coded images, where one contains texture maps and the other contains opacity maps of MPI layers in HEIF.

Both of the HEVC-coded texture image and opacity images are stored as items of 'hvc1'. Each HEVC image item of type 'hvc1' contains individual coded HEVC image bitstream containing exactly one access unit of texture map and opacity map, respectively. All decoder configuration information (e.g., parameter sets and information about the coding itself) required to initialize the decoder is stored as 'hvcC' property. Each HEVC image item of type 'hvc1' shall have an association with the 'hvcC' property.

The texture map is stored as a master HEVC image item of type 'hvc1' and the opacity map is stored as an HEVC auxiliary image item of 'hvc1' indicating it contains the alpha plane for the master image. The auxiliary opacity image and the master texture image are linked using an item reference of 'aux1' from the auxiliary image to the master image. The auxiliary image of the opacity map is associated with an AuxiliaryTypeProperty 'auxC' identifying the type of the auxiliary image as alpha plane such as, by "urn:mpeg:mpegB:cicp:systems:auxiliary:alpha" as the aux_type value.

When MPI metadata is stored in the MPIInformationProperty, each HEVC image item of type 'hvc1' shall have an association to the MPIInformationProperty. essential shall be equal to 1 for an MPIInformationProperty. Optionally, the CameraExtrinsicMatrixProperty and the Camera IntrinsicMatrixProperty are present and both are associated with a master texture HEVC image item.

An HEIF file containing two independently HEVC-coded images, where one contains texture map and the other contains opacity map of MPI layers is structured as follows. Individual picture is coded as HEVC-coded image and stores as items of 'hvc1'. The opacity map is stored as an HEVC auxiliary image item by indicating it contains the alpha plane by 'auxC' image properties. The auxiliary opacity image and the master texture image are linked using an item reference of 'aux1' from the auxiliary image to the master image. The MPI metadata is stored as an item property of type 'mpii' and marked as essential since it needs to be processed. The extrinsic and intrinsic camera information is store as an item property of type 'cmex' and 'cmin', respectively. The association between image items and image properties is indicated in ItemPropertyAssociationBox ('ipma'). Since MPI metadata needs to be processed with both of a master texture map and an auxiliary opacity map, 'mpii' item property needs to be associated with both of image items. An example description is given Table 9.

TABLE 9

Example of storing separate texture and opacity HEVC-coded MPI images in HEIF

```
FileTypeBox 'ftyp': major-brand='heic', compatible-brands='heic'
MetaBox 'meta':
    HandlerBox 'hdlr': 'pict'
    PrimaryItemBox 'pitm': item_ID=1;
    ItemInfoBox 'iinf': entry_count=2
        1) 'infe': item_ID=1, item_type='hvc1';
        2) 'infe': item_ID=2, item_type='hvc1';
    ItemLocationBox 'iloc': item_count=2
        item_ID=1, extent_count=1, extent_offset=P0, extent_length=Q0;
        item_ID=2, extent_count=1, extent_offset=P1, extent_length=Q1;
    ItemReferenceBox:
        referenceType='aux1', from_item_ID=2, ref_count=1,
to_item_ID=1;
    ItemPropertiesBox 'iprp':
        ItemPropertyContainerBox 'ipco':
            'hvcC'
            'ispe'
            'mpii'
            'cmex'
            'cmin'
            'auxC' (identifying the associated item as alpha plane)
        ItemPropertyAssociation 'ipma': entry_count=1
            1) item ID=1, association_count=5
                essential=1, property_index=1;
                essential=0, property_index=2;
                essential=1, property_index=3;
                essential=0, property_index=4;
                essential=0, property_index=5;
            2) item ID=2, association_count=4
                essential=1, property_index=1;
                essential=0, property_index=2;
                essential=1, property_index=3;
                essential=1, property_index=6;
MediaDataBox:
    HEVC Image (at file offset P0, with length Q0, containing the
texture map)
    HEVC Image (at file offset P1, with length Q1, containing the
opacity map
```

When MPI metadata is stored in XMP metadata items, an HEIF file is structed as in Table 10.

TABLE 10

Example of HEIF file with XMP metadata for HEVC-coded MPI
with separate texture and opacity images

```
FileTypeBox 'ftyp' : major-brand='heic', compatible-brands='heic'
MetaBox 'meta': (container)
   HandlerBox 'hdlr': 'pict'
   PrimaryItemBox 'pitm': item_ID=1;
   ItemInfoBox 'iinf': entry_count=3
      1) 'infe': item_ID=1, item_type='hvc1';
      2) 'infe': item_ID=2, item_type='hvc1';
      3) 'infe': item_ID=3, item_type='mime';
   ItemLocationBox 'iloc': item_count=3
      item_ID=1, extent_count=1, extent_offset=P0, extent_length=Q0;
      item_ID=2, extent_count=1, extent_offset=P1, extent_length=Q1;
      item_ID=3, extent_count=1, extent_offset=P2, extent_length=Q2;
   ItemReferenceBox:
      referenceType='aux1', from_item_ID=2, reference_count=1,
to_item_ID=1;
      referenceType='cdsc', from_item_ID=3, ref_count=2,
to_item_ID=1,
to_item_ID=2;
   ItemPropertiesBox 'iprp':
      ItemPropertyContainerBox 'ipco'
         'hvcC'
         'ispe'
         'auxC'
      ItemPropertyAssociation 'ipma': entry_count=2
         1) item_ID=1, association_count2,
            essential=1, property_index=1;
            essential=0, property_index=2;
         2) item_ID=2, association_count=3,
            essential=1, property_index=1;
            essential=0, property_index=2;
            essential=1, property_index=3;
MediaDataBox:
   HEVC Image (at file offset P0, with length Q0, containing the
texture map)
   HEVC Image (at file offset P1, with length Q1, containing the
opacity map)
   XMP data (at file offset P2, with lwngth Q2)
```

When the MPI metadata is stored in the T.35 metadata item as an item of item_type value 'it35', as described earlier, the T.35 metadata item is linked to two image items, which containing texture map or opacity map, by item references of type 'cdsc'. An HEIF file with two coded image items and T.35 metadata item is structured as follows:

```
FileTypeBox 'ftyp' :major-brand='heic', compatible-brands='heic'
MetaBox 'meta': (container)
   HandlerBox 'hdlr': 'pict'
   PrimaryItemBox 'pitm': item_ID=1;
   ItemInfoBox 'iinf': entry_count=3
      1) 'infe': item_ID=1, item_type='hvc1';
      2) 'infe': item_ID=2, item_type='hvc1';
      3) 'infe': item_ID=3, item_type='it35';
   ItemLocationBox 'iloc': item_count=3
      item_ID=1, extent_count=1, extent_offset=P0, extent_length=Q0;
      item_ID=2, extent_count=1, extent_offset=P1, extent_length=Q1;
      item_ID=3, extent_count=1, extent_offset=P2, extent_length=Q2;
   ItemReferenceBox:
      referenceType='aux1', from_item_ID=2, reference_count=1,
to_item_ID=1;
      referenceType='cdsc', from_item_ID=3, ref_count=2,
         to_item_ID=1,
         to_item_ID=2;
   ItemPropertiesBox 'iprp':
      ItemPropertyContainerBox 'ipco':
         'hvcC'
         'ispe'
         'auxC'
      ItemPropertyAssociation 'ipma': entry_count=2
         1) item_ID=1, association_count2,
            essential=1, property_index=1;
            essential=0, property_index=2;
```

-continued

```
      2) item_ID=2, association_count=3,
         essential=1, property_index=1;
         essential=0, property_index=2;
         essential=1, property_index=3;
MediaDataBox:
   HEVC Image (at file offset P0, with length Q0, containing the
texture map)
   HEVC Image (at file offset P1, with length Q1, containing the
opacity map)
   T.35 data (at file offset P2, with length Q2)
```

Example Format to Encapsulate Two VVC-Coded MPI-Related Images

This section describes a format to encapsulate two VVC-coded images, where one contains texture maps and the other contains opacity maps of MPI layers in HEIF.

Each VVC image item of type 'vvc1' contains individual coded VVC image bitstream containing exactly one access unit of texture map and opacity map, respectively. All decoder configuration information (e.g., parameter sets and information about the coding itself) required to initialize the decoder is stored as 'vvcC' property. Each VVC image item of type 'vvc1' shall have an association with the 'vvcC' property.

The texture map is stored as a master VVC image item of type 'hvc1' and the opacity map is stored as an VVC auxiliary image item of 'vvc1' indicating it contains the alpha plane for the master image. The auxiliary opacity image and the master texture image are linked using an item reference of 'aux1' from the auxiliary image to the master image. The auxiliary image of the opacity map is associated with an AuxiliaryTypeProperty 'auxC' identifying the type of the auxiliary image as alpha plane, such as, by "urn: mpeg:mpegB:cicp:systems:auxiliary:alpha" as the aux_type value.

When MPI metadata is stored in the MPIInformationProperty, each VVC image item of type 'vvc1' shall have an association to the MPIInformationProperty. essential shall be equal to 1 for the MPIInformationProperty. Optionally, the CameraExtrinsicMatrixProperty and the Camera IntrinsicMatrixProperty are present and both are associated with a master texture VVC image item.

Table 11 illustrates the encapsulation of two VVC coded images of texture and opacity map in HEIF. Each individual picture is coded as VVC coded image and stored as items of 'vvc1'. The opacity map is stored as an VVC auxiliary image item by indicating it contains the alpha plane by 'auxC' image property. The auxiliary opacity image and the master texture image are linked using an item reference of 'aux1' from the auxiliary image to the master image. The MPI metadata is stored as an item property of type 'mpii' and marked as essential since it needs to be processed. The extrinsic and intrinsic camera information is store as an item property of type 'cmex' and 'cmin', respectively. The association between image items and image properties is indicated in ItemPropertyAssociationBox ('ipma'). Since MPI metadata needs to be processed with both of a master texture map and an auxiliary opacity map, 'mpii' item property needs to be associated with both of image items.

TABLE 11

Example of storing separate texture and opacity VVC-coded
MPI images in HEIF

```
FileTypeBox 'ftyp' :major-brand='vvic', compatible-brands='vvic'
MetaBox 'meta':
```

TABLE 11-continued

Example of storing separate texture and opacity VVC-coded
MPI images in HEIF

```
HandlerBox 'hdlr': 'pict'
PrimaryItemBox 'pitm': item_ID=1;
ItemInfoBox 'iinf': entry_count=2
    1) 'infe': item_ID=1, item_type='vvc1';
    2) 'infe': item_ID=2, item_type='vvc1';
ItemLocationBox 'iloc': item_count=1
    item_ID=1, extent_count=1, extent_offset=X, extent_length=Y;
    item_ID=2, extent_count=1, extent_offset=P1, extent_length=Q1;
ItemReferenceBox:
    referenceType='aux1', from_item_ID=2, reference_count=1,
to_item_ID=1;
    ItemPropertiesBox 'iprp':
        ItemPropertyContainerBox 'ipco':
            'vvcC'
            'ispe'
            'mpii'
            'cmex'
            'cmin'
            'auxC'
        ItemPropertyAssociation 'ipma': entry_count=2
            1) item_ID=1, association_count=5,
                essential=1, property_index=1;
                essential=0, property_index=2;
                essential=1, property_index=3;
                essential=0, property_index=4;
                essential=0, property_index=5;
            2) item_ID=2, association_count=4,
                essential=1, property_index=1;
                essential=0, property_index=2;
                essential=1, property_index=3;
                essential=1, property_index=6;
MediaDataBox: 'mdat' or 'idat':
    VVC Image (at file offset X, with length Y, containing the
texture map)
    VVC Image (at file offset P1, with length Q1, containing the
opacity map)
```

When MPI metadata is stored in XMP metadata items, Table 12 depicts an example of an HEIF file.

TABLE 12

Example of HEIF file with XMP metadata for VVC-coded
MPI with separate texture and opacity images

```
FileTypeBox 'ftyp' :major-brand='vvic', compatible-brands='vvic'
MetaBox 'meta': (container)
    HandlerBox 'hdlr': 'pict'
    PrimaryItemBox 'pitm': item_ID=1;
    ItemInfoBox 'iinf': entry_count=3
        1) 'infe': item_ID=1, item_type='vvc1';
        2) 'infe': item_ID=2, item_type='vvc1';
        1) 'infe': item_ID=3, item_type='mime';
    ItemLocationBox 'iloc': item_count=3
        item_ID=1, extent_count=1, extent_offset=P0, extent_length=Q0;
        item_ID=2, extent_count=1, extent_offset=P1, extent_length=Q1;
        item_ID=3, extent_count=1, extent_offset=P2, extent_length=Q2;
    ItemReferenceBox:
        referenceType='aux1', from_item_ID=2, reference_count=1,
to_item_ID=1;
        referenceType='cdsc', from_item_ID=3, reference_count=2,
            to_item_ID=1;
            to_item_ID=2;
    ItemPropertiesBox 'iprp':
        ItemPropertyContainerBox 'ipco':
            'vvcC'
            'ispe'
            'auxC'
        ItemPropertyAssociation 'ipma': entry_count=2
            1) item_ID=1, association_count2,
                essential=1, property_index=1;
                essential=0, property_index=2;
```

TABLE 12-continued

Example of HEIF file with XMP metadata for VVC-coded
MPI with separate texture and opacity images

```
        2) item_ID=2, association_count=3,
            essential=1, property_index=1;
            essential=0, property_index=2;
            essential=1, property_index=3;
MediaDataBox:
    VVC Image (at file offset P0, with length Q0, containing the
texture map)
    VVC Image (at file offset P1, with length Q1, containing the
opacity map)
    XMP data (at file offset P2, with length Q2)
```

When, as described earlier, the MPI metadata is stored in the T.35 metadata item as an item of item_type value 'it35', the T.35 metadata item is linked to two image items, which include a texture map and/or an opacity map, by item references of type 'cdsc'. An HEIF file with two coded image items and T.35 metadata item is structured as follows:

```
FileTypeBox 'ftyp' :major-brand='vvic', compatible-brands='vvic'
MetaBox 'meta': (container)
    HandlerBox 'hdlr': 'pict'
    PrimaryItemBox 'pitm': item_ID=1;
    ItemInfoBox 'iinf': entry_count=3
        1) 'infe': item_ID=1, item_type='vvc1';
        2) 'infe': item_ID=2, item_type='vvc1';
        1) 'infe': item_ID=3, item_type='it35';
    ItemLocationBox 'iloc': item_count=3
        item_ID=1, extent_count=1, extent_offset=P0, extent_length=Q0;
        item_ID=2, extent_count=1, extent_offset=P1, extent_length=Q1;
        item_ID=3, extent_count=1, extent_offset=P2, extent_length=Q2;
    ItemReferenceBox:
        referenceType='aux1', from_item_ID=2, reference_count=1,
to_item_ID=1;
        referenceType='cdsc', from_item_ID=3, reference_count=2,
            to_item_ID=1;
            to_item_ID=2;
    ItemPropertiesBox 'iprp':
        ItemPropertyContainerBox 'ipco':
            'vvcC'
            'ispe'
            'auxC'
        ItemPropertyAssociation 'ipma': entry_count=2
            1) item_ID=1, association_count2,
                essential=1, property_index=1;
                essential=0, property_index=2;
            2) item_ID=2, association_count=3,
                essential=1, property_index=1;
                essential=0, property_index=2;
                essential=1, property_index=3;
MediaDataBox:
    VVC Image (at file offset P0, with length Q0, containing the
texture map)
    VVC Image (at file offset P1, with length Q1, containing the
opacity map)
    T.35 data (at file offset P2, with length Q2)
```

Example Player Operation

Figure 4:
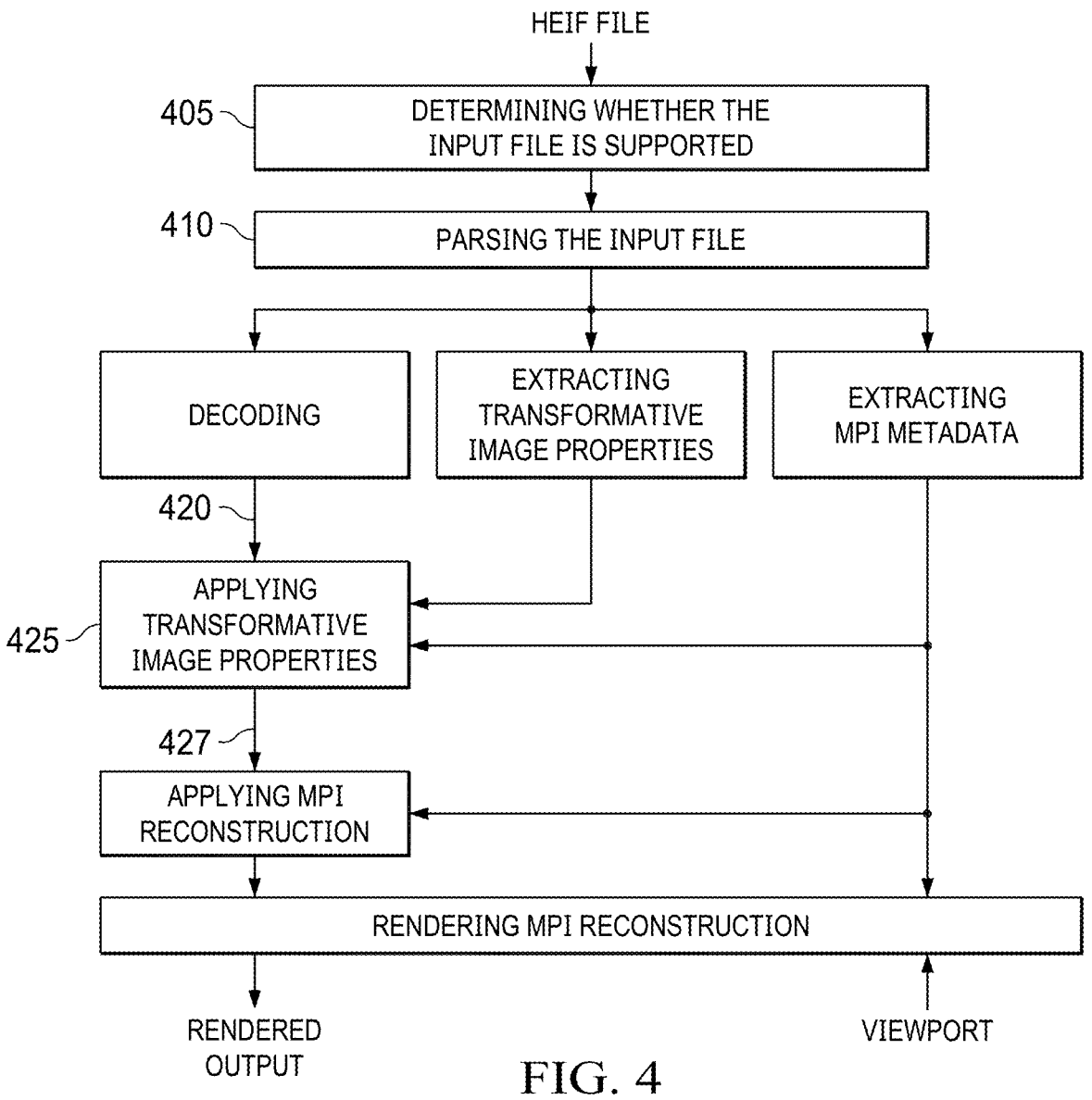
FIG. 4 depicts an example process flow to render an HEIF file containing an MPI representation according to an embodiment of this invention.

This section provides an example embodiment of the player operation with the input of an HEIF file containing the coded MPI image(s) and the associated MPI metadata. FIG. 4 describes an example of the player operation and how it generates the rendered output which fits to a user viewport from the input of an HEIF file.

In step 405, the player starts by determining whether the input HEIF file is fully supported. A player shall not process an image item that is associated with a property marked as essential that is not recognized or not supported. When the player supports the essential properties in the input file, in step 410, the player starts to parse the input HEIF file and extracts the coded image items and decoder configuration information from the input HEIF file. The player initializes the decoder by using the extracted decoder configuration information and decodes the coded images into a single decoded item or two decoded images accordingly (420). When the transformative image properties are present, it applies (425) the transformative properties into the decoded images. Also, by using MPI metadata extracted from the input HEIF file, it obtains texture and opacity map of MPI layers (427).

When the decoded image is the spatially packed texture and opacity map, the player recognizes the location of texture and opacity map of MPI layers in the decoded frame, according to MPI metadata. Also, when the two decoded images are decoded, the player recognizes which one is texture map and which one is the opacity map of MPI layers by using associated image properties and obtains texture and opacity map of MPI layers. Then, the MPI scene representation is reconstructed from the texture and opacity map of MPI layers and MPI metadata include the depth of each layer. Camera information in terms of intrinsic and extrinsic matrices from the MPI metadata is used for the warping process in order to preserve the real-world coordinates and synchronize multiple cameras. When both are absent, the renderer can perform view synthesis with a pre-defined, universal camera intrinsic matrix. After reconstruction, the rendered output which fits to the user viewport is generated and displayed.

Carriage of Multiple Representations in a Single HEIF

An HEIF file can contain image items representing alternatives of the same source in same alternate group. In this case, the below EntityToGroupBox with grouping_type equal to 'altr' is present in the GroupsListBox since GroupsListBox contains EntityToGroupBoxes, each specifying one entity group.

```
aligned (8) class EntityToGroupBox (grouping_type, version, flags)
extends FullBox (grouping_type, version, flags) {
    unsigned int (32) group_id;
    unsigned int (32) num_entities_in_group;
    for (i=0; i<num_entities_in_group; i++)
        unsigned int (32) entity_id;
// the remaining data may be specified for a particular grouping_type
}
```

The Entity ToGroupBox with grouping_type equal to 'altr' indicates a set of images that are alternatives to each other and out of which only one is selected for displaying or processing.

The Table below describes the case when 2D HEVC image and MPI image, which are coded with HEVC, are carried in a same HEIF file. The MPI images are stored as an HEVC image item and the HEVC image item is associated with MPI metadata item property ('mpii' item property), descried earlier. MPI metadata, as described earlier, could be carried in an XMP metadata item or in an T.35 metadata item. In this case, the XMO metadata item or T.35 metadata item is linked to the HEVC image item by item references of type 'cdsc'. Then, these two HEVC image items are indicated as alternative to each other by using a Entity ToGroupBox with grouping_type equal to 'altr'.

```
FileTypeBox 'ftyp' :major-brand='heic', compatible-brands='heic'
MetaBox 'meta':
    HandlerBox 'hdlr': 'pict'
    PrimaryItemBox 'pitm': item_ID=1;
    ItemInfoBox 'iinf': entry_count=12
```

-continued

```
    1) 'infe': item_ID=1, item_type='hvc1';
    2) 'infe': item_ID=2, item_type='hvc1';
ItemLocationBox 'iloc': item_count=2
    item_ID=1, extent_count=1, extent_offset=X, extent_length=Y;
    item_ID=2, extent_count=1, extent_offset=X2, extent_length=Y2;
    item_ID=3, extent_count=1, extent_offset=P2, extent_length=Q2;
ItemPropertiesBox 'iprp':
    ItemPropertyContainerBox 'ipco':
        'hvcC'
        'ispe'
        'mpii'
        'cmex'
        'cmin'
    ItemPropertyAssociation 'ipma': entry_count=2
        1) item_ID=1, association_count=5,
            essential=1, property_index=1;
            essential=0, property_index=2;
            essential=1, property_index=3;
            essential=0, property_index=4;
            essential=0, property_index=5;
        2) item_ID=2, association_count=4,
            essential=1, property_index=1;
            essential=0, property_index=4;
            essential=0, property_index=5;
    GroupsListBox 'grpl':
        EntityToGroupBox 'altr': group_id=0, num_entities_in_group=2
            entity_id=1
            entity_id=2
MediaDataBox 'mdat' or 'idat' :
    HEVC Image (at file offset X, with length Y, containing MPI image)
    HEVC inage (at file offset X2, with length Y2, containing 2D
image)
```

Figure 5:
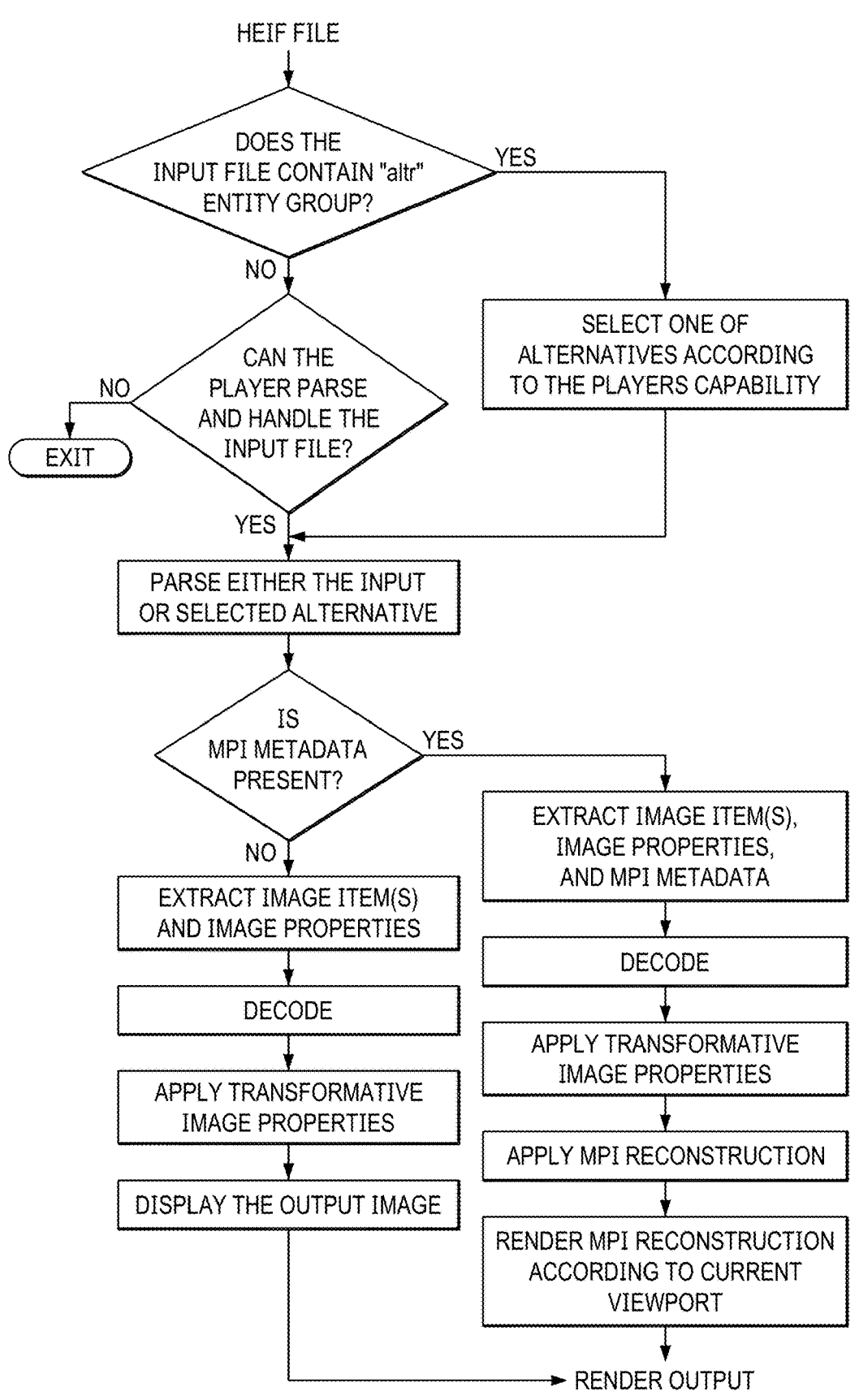
FIG. 5 depicts an example workflow for an HEIF player supporting the presence of alternative media representations in the same file according to an embodiment of this invention; a FIG. 6, depicts the encapsulation of an MPI image as a V3C bitstream in a file according to an embodiment of this invention.

FIG. 5 depicts an example workflow for an HEIF player supporting the presence of alternative media representations in the same file according to an embodiment. The HEIF player recognizes the presence of alternative representations in the file via the 'altr' grouping type, and if the alternative representations are present, the player selects one of the alternative media representations appropriately according to the player's capability. For example, when the player supports MPI playback, it checks the presence of alternatives and selects the MPI representation among the alternatives. If no alternatives are present, the player first checks that the input file is a supported MPI representation. When the input file is supported, the player decodes the coded image, reconstructs the MPI using the MPI metadata extracted from the file, and renders it appropriately according to the current viewport. Otherwise, when the player only supports 2D image playback, the player recognizes the presence of multiple alternatives, then, if alternatives are present, selects an appropriate 2D image representation among the alternatives, and processes accordingly. If no alternatives are present, then the player checks whether the current input file can be processed, and either processes it accordingly or exits.

Carriage of V3C-Coded MPI Images in HEIF

Visual volumetric video-based coding (V3C) provides a mechanism for coding visual volumetric frames. Visual volumetric frames are coded by converting the 3D volumetric information into a collection of 2D images and associated data. The converted 2D images are coded using widely available video and image coding specifications and the associated data, i.e., video data may be coded using HEVC or VVC and atlas data is coded according to ISO/IEC 23090-5. The coded images and the coded atlas data are multiplexed and form a V3C bitstream.

Figure 6:
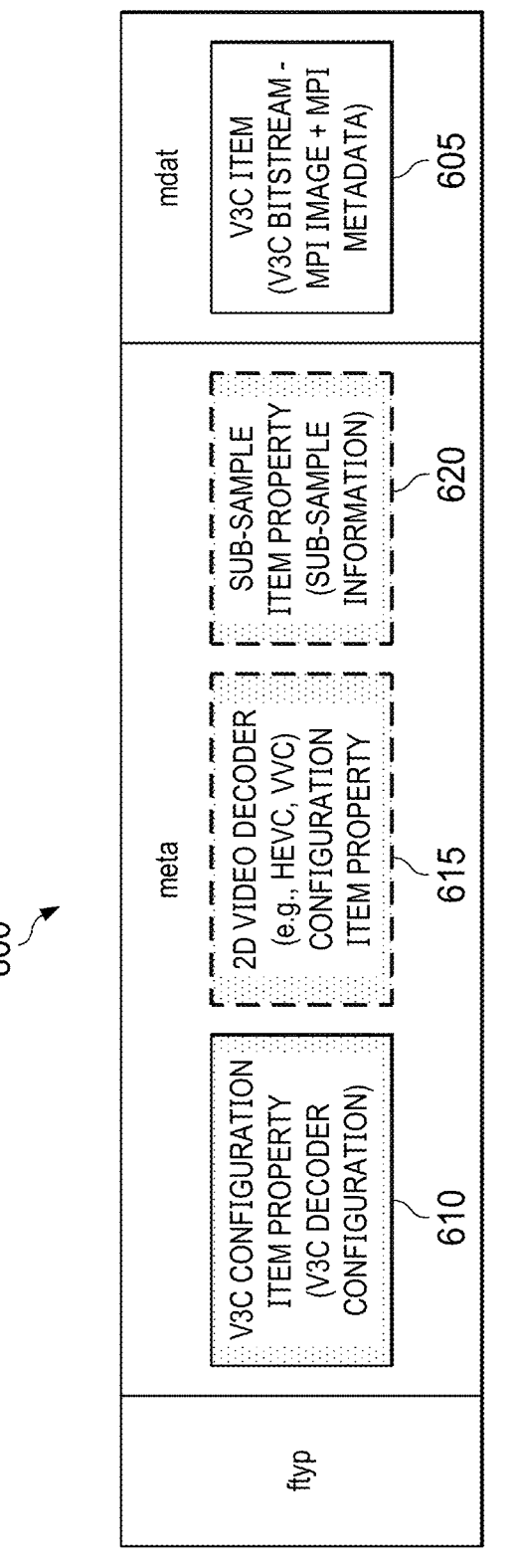

This section specifies example embodiments of a format to encapsulate non-timed multi-plane image (MPI) data in an HEIF file. FIG. 6, depicts an example embodiment of the encapsulation of an MPI image as a V3C bitstream in an HEIF file (600). An MPI image is coded as a V3C bitstream which consists of one or more V3C units, and each V3C unit contains the video data unit containing the coded MPI image or the coded atlas data containing the associated MPI metadata. The V3C bitstream is stored in a V3C item (605). The associated V3C decoder configuration information is carried in a V3C configuration item property (610), while 2D video decoder configuration information is carried in the corresponding video decoder configuration item property (615), as defined in Refs. [1-2], and sub-sample information is carried in a sub-sample item property (620).

The handler type for the MetaBox shall be 'volv' to indicate the presence of V3C items. A V3C item is an item which represents a single visual volumetric video frame of the coded MPI image. The V3C item contains one or more V3C units of the coded MPI image. Items of type 4CC codes 'v3e1' identify V3C items.

Items of type 'v3e1' shall be associated with one V3CConfigurationProperty. Items of type 'v3e1' can be associated with one sub-sample item property of type 'subs', and a 2D video decoder configuration item property, such as HEVC configuration item property with type 'hvcC', or a VVC configuration item property with type 'vvcC'.

If PrimaryItemBox exists, then item_ID in this box shall be set to indicate a V3C item of type 'v3e1'. Example syntax:

```
aligned (8) class V3CItemData {
    for (int i=0; i < item_size; ) { // derived from ItemLocationBox
        unsigned int (v3c_config.unit_size_precision_bytes_minus1 + 1) *8)
v3c_unit_size;
        bit (8) ss_v3c_unit [v3c_unit_size] ;
        i += v3c_unit_size + v3c_config.unit_size_precision_bytes_minus1
+ 1;
    }
}
```

In the syntax above, the following apply:

The value of item_size is equal to the sum of the extent-_length values of each extent of the item, as specified in the ItemLocationBox.

v3c_config indicates the record in the associated V3CConfigurationProperty.

v3c_unit_size specifies the size, in bytes, of the ss_v3c_unit array. This size is equivalent to the sample stream V3C unit size ssnu_v3c_unit_size as defined in ISO/IEC 23090-5, Annex C.

ss_v3c_unit contains a single V3C unit in V3C unit sample stream format as defined in ISO/IEC 23090-5: 2021, Annex C.

V3C Item Properties

General

Two descriptive item properties are defined: the V3C configuration item property carries the V3C decoder configuration and initialization information, and the sub-sample item property contains subsample information, such as, the offset of each sub-sample containing a V3C unit to enable to access per sub-sample.

V3C Configuration Item Property

Definition

Box Types: 'v3cc'
Property type: Descriptive item property
Container: ItemPropertyContainerBox
Mandatory (per item): Yes, for a V3C item of type 'v3e1'
Quantity (per item): Zero or more for a coded image item
V3CConfigurationProperty contains the V3C decoder configuration record, as described later, which provides the V3C bitstream's decoding specific information (i.e. parameter sets and SEI messages) for further configuration and initialization of the V3C decoder. The V3CConfigurationProperty shall be associated with the 'v3e1' V3C item. The V3C configuration item property is an essential property and the corresponding essential flag in the ItemProperyAssociationBox shall be set to 1 for a 'v3cC' item property.

---

Syntax

```
aligned (8) class V3CConfigurationProperty extends
ItemProperty ( 'v3cC', version=0, flags) {
    V3CDecoderConfigurationRecord v3c_config (version) ;
}
```

---

Semantics
v3c_config contains a single instance of V3CDecoderConfigurationRecord which provides V3C bitstream's decoding specific information (i.e. parameter sets and SEI messages) for further configuration and initialization of the V3C decoder.

Sub-Sample Item Property

Definition

Box type: 'subs'
Property type: Descriptive item property
Container: ItemPropertyContainerBox
Mandatory (per item): No
Quantity (per item): Zero or one for a coded image item
Sub-sample information for a coded V3C image may be given using an associated item property that is exactly identical to SubSampleInformationBox as defined later and for the coding format of the associated coded image item. The entry_count field of the SubSampleInformationBox shall be equal to 1, and the sample_delta field of the SubSampleInformationBox shall be equal to 0.

The 32-bit unit header of the V3C unit which represents the sub-sample shall be copied to the 32-bit codec_specific_parameters field of the sub-sample entry in the SubSampleInformationBox. The V3C unit type of each sub-sample is identified by parsing the codec_specific_parameters field of the sub-sample entry in the SubSampleInformationBox.

Encapsulation Example

The example below illustrates the encapsulation of a V3C bitstream containing a single HEVC coded image in HEIF. The HEVC-coded image is stored as items of 'hvc1'. The coded data for the image is contained either in a Media Data box ('mdat') or in an Item Data box ('idat'). The association between an V3C item and image properties is indicated in ItemPropertyAssociationBox ('ipma'). Since V3C decoder configuration and the corresponding HEVC decoder configuration metadata shall be processed, the image properties of 'v3cC' and 'hvcC' are marked as essential. A player shall not process an item that is associated with a property marked as essential that is not recognized or not supported. To enable sub-sample level access, sub-sample information is carried in 'subs'. If the sub-sample level access is not mandatory, then 'subs' is marked as non-essential.

```
FileTypeBox 'ftyp' :major-brand='heic', compatible-brands='heic'
MetaBox 'meta':
    HandlerBox 'hdlr': 'volv'
    PrimaryItemBox 'pitm': item_ID=1;
    ItemInfoBox 'iinf': entry_count=12
        1) 'infe': item_ID=1, item_type='v3e1';
    ItemLocationBox 'iloc': item_count=1
        item_ID=1, extent_count=1, extent_offset=X, extent_length=Y;
    ItemPropertiesBox 'iprp':
        ItemPropertyContainerBox 'ipco':
            'v3cC'
            'hvcC'
            'subs'
        ItemPropertyAssociation 'ipma': entry_count=1
            1) item_ID=1, association_count=3,
                essential=1, property_index=1;
                essential=1, property_index=2;
                essential=0, property_index=3;
MediaDataBox 'mdat' or 'idat':
    HEVC Image (at file offset X, with length Y)
```

Example Player Operation

Figure 7:
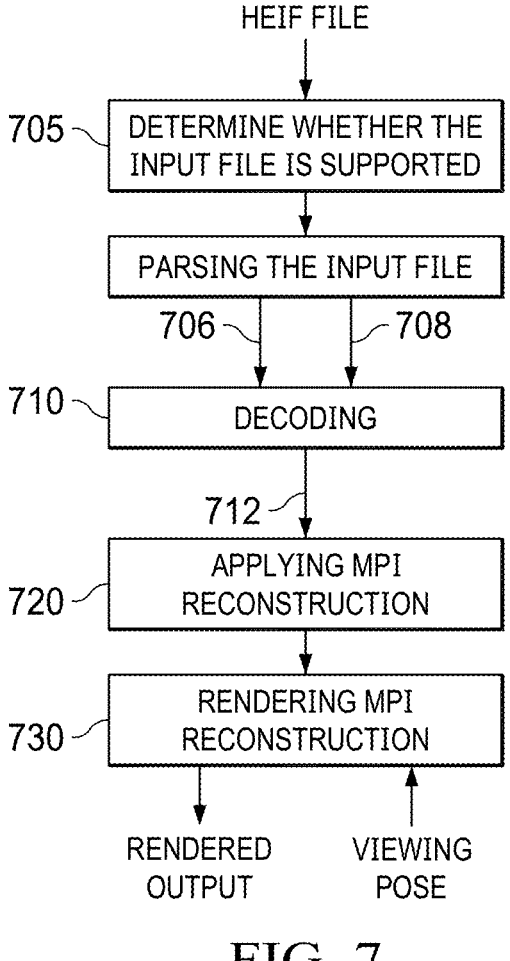
FIG. 7 depicts an example of a player's operation when receiving an MPI bitstream encapsulated in an HEIF file supporting a V3C representation, according to an embodiment of this invention.

FIG. 7 depicts an example process for the player operation and how it generates the rendered output which fits to user viewport from an HEIF file of an MPI image as proposed. Given an input HEIF file, first (705), the player determines whether the input file is supported. A player should not process an image item that is associated with a property marked as essential that is not recognized or not supported. When the player supports the essential properties in the input file, the player starts to parse the input file and extracts the V3C bitstream (708) from the V3C item, together with V3C decoder configuration information (610) and 2D video decoder configuration information (615) from image item properties (706) in the input HEIF file.

Next, the player initializes the decoder by using the extracted decoder configuration information and decodes (710) the V3C bitstream into a single decoded image and atlas data (712). The decoded image includes the spatially packed texture and opacity map. The atlas data contains the location of texture and transparency of each MPI layer in the decoded frame, depth of each MPI layer, and extrinsic and intrinsic camera information. The player recognizes the location of texture and opacity map of MPI layers in the decoded frame by using atlas data. Then, the MPI scene representation is reconstructed (720) from the texture and opacity map of MPI layers and the depth information of each layer in atlas data. Camera information in terms of intrinsic and extrinsic matrices from the atlas data may be used for the warping process to preserve the real-world coordinates and synchronize multiple cameras. After reconstruction, the rendered output which fits to the user's viewport is generated and displayed (730).

REFERENCES

Each one of the references listed herein is incorporated by reference in its entirety.

[1] ISO/IEC 23008-12:2022, Information technology—MPEG systems technologies—Part 12: Image File Format.

[2] ISO/IEC 23008-12:2022/AMD 1:2022 (E) Information technology—MPEG systems technologies—Part 12: Image File Format.

[3] ISO/IEC 14496-12:2022 (DIS), Information technology, Coding of audio-visual objects, Part 12: ISO base media file format (ISOBMFF).

[4] T. Lu et al., "Transmission of volumetric images in Multiplane Image format," U.S. Provisional Patent application 63/495,715, filed on Apr. 12, 2023.

[5] Recommendation ITU-T T.35, "Procedure for the allocation of ITU-T defined codes for non-standard facilities," (February 2000), ITU.

[6] ISO/IEC 23090-10:2022, Information technology—Coded representation of immersive media—Part 10: Carriage of visual volumetric video-based coding data.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to an imaging file format for MPI, such as those described herein. The computer and/or IC may compute any of a variety of parameters or values that relate to an imaging file format for MPI described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to an imaging file format for MPI as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted. Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to an imaging file format for MPI are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Annex

This Annex provides copies of relevant syntax and semantics from ISO/IEC 23090-10 (Ref. [6]) and ISO/IEC 14496-12 (Ref. [3]).
From ISO/IEC 23090-10.
V3C Decoder Configuration Record

Definition

The V3C decoder configuration record provides V3C bitstream's decoding specific information (i.e. parameter sets and SEI messages) for further configuration and initialization of the V3C decoder.

---

Syntax

```
aligned (8) class V3CDecoderConfigurationRecord
(unsigned int version)
{
    if (version == 0) {
        unsigned int (3) unit_size_precision_bytes_minus1;
        unsigned int (5) num_of_v3c_parameter_sets;
        for (int i=0; i < num_of_v3c_parameter_sets; i++) {
            unsigned int (16) v3c_parameter_set_length;
            bit (8) v3c_parameter_set [v3c_parameter_set_length] ;
        }
        unsigned int (8) num_of_setup_unit_arrays;
        for (int j=0; j < num_of_setup_unit_arrays; j++) {
            unsigned int (1) array_completeness;
            bit (1) reserved = 0;
            unsigned int (6) nal_unit_type;
            unsigned int (8) num_nal_units;
            for (int i=0; i < num_nal_units; i++) {
                unsigned int (16) setup_unit_length;
                bit (8) setup_unit [setup_unit_length] ;
            }
        }
    }
}
```

---

Semantics
unit_size_precision_bytes_minus1 plus 1 specifies the precision, in bytes, of the sample stream NAL unit or sample stream V3C unit to which this configuration record applies. The value of this field shall be conditional on the 4CC-code of the sample entry. For V3C atlas tracks unit_size_precision_bytes_minus1 shall be equal to ssnh_unit_size_precision_bytes_minus1 in sample_stream_nal_header ( ). For V3C bitstream tracks unit_size_precision_bytes_minus1 shall be equal to ssvh_unit_size_precision_bytes_minus1 in sample_stream_v3c_header ( ).

num_of_v3c_parameter_sets specifies the number of V3C parameter set units signalled in the decoder configuration record.
v3c_parameter_set_length indicates the size, in bytes, of the v3c_parameter_set array. The signalled value shall not be equal to 0.
NOTE. v3c_parameter_set_length syntax element defined in ISO/IEC 23090-5 can be represented by up to 64 bits, this document limits the representation of the information to 16 bits as it suffices in practical implementations.
v3c_parameter_set is an array of data containing the entire v3c_unit of type V3C_VPS, as defined in ISO/IEC 23090-5.
num_of_setup_unit_arrays indicates the number of arrays of atlas NAL units of the indicated type(s).
array_completeness when equal to 1 indicates that all atlas NAL units of the given type are in the following array and none are in the stream; when equal to 0 indicates that additional atlas NAL units of the indicated type may be in the stream; the default and permitted values are constrained by the sample entry name.
nal_unit_type indicates the type of the atlas NAL units in the following array (which shall be all of that type); it takes a value as defined in ISO/IEC 23090-5; it is restricted to take one of the values indicating a NAL_ASPS, NAL_AAPS, NAL_AFPS, NAL_PREFIX_ESEI, NAL_PREFIX_NSEI, NAL_SUFFIX_ESEI, or NAL_SUFFIX_NSEI atlas NAL unit.
num_nal_units indicates the number of atlas NAL units of type nal_unit_type included in the configuration record for the stream to which this configuration record applies.
setup_unit_length indicates the size, in bytes, of the setup_unit array. The signalled value shall not be equal to 0.
setup_unit is an array of data containing the entire nal_unit as defined in ISO/IEC 23090-5. The contained NAL unit shall be of the same type as specified by nal_unit_type. When present in setup_unit, NAL_PREFIX_ESEI, NAL_PREFIX_NSEI, NAL_SUFFIX_ESEI, or NAL_SUFFIX_NSEI contain SEI messages of a 'declarative' nature, that is, those that provide information about the stream as a whole.
From ISO/IEC 14496-12
Sub-Sample Information Box

Definition

Box Type: 'subs'
Container: SampleTableBox or TrackFragmentBox
Mandatory: No
Quantity: Zero or more
This box is designed to contain sub-sample information. The sub-sample information item property contains sub-sample information which is stored in the V3C item. It includes the number of sub-samples, which type of V3C unit is carried in each subsample, and the subsample offset in V3C item. This information enables to access sub-sample containing an V3C unit and to effectively decode the particular type of V3C unit from the V3C item. That is, the sub-sample information enables the player to extract the V3C video data unit by using the offset of V3C video unit and to decode it using the 2D video decoder, or to extract V3C atlas data units and to decode them by the V3C atlas decoder.

A sub-sample is a contiguous range of bytes of a sample. The specific definition of a sub-sample shall be supplied for a given coding system (e.g. for ISO/IEC14496-10:2014 Advanced Video Coding). In the absence of such a specific definition, this box shall not be applied to samples using that coding system.

If subsample_count is 0 for any entry, then those samples have no subsample information and no array follows. The table is sparsely coded; the table identifies which samples have sub-sample structure by recording the difference in sample-number between each entry. The first entry in the table records the sample number of the first sample having sub-sample information.

> NOTE It is possible to combine subsample_priority and discardable such that when subsample_priority is smaller than a certain value, discardable is set to 1. However, since different systems may use different scales of priority values, separating them is safer, to have a clean solution for discardable sub-samples.

When more than one SubSampleInformationBox is present in the same container box, the value of flags shall differ in each of these SubSampleInformationBoxes. The semantics of flags, if any, shall be supplied for a given coding system. If flags have no semantics for a given coding system, the flags shall be 0.

---

Syntax

```
aligned (8) class SubSampleInformationBox
    extends FullBox ('subs', version, flags) {
    unsigned int (32) entry_count;
    int i, j;
    for (i=0; i < entry_count; i++) {
        unsigned int (32) sample_delta;
        unsigned int (16) subsample_count;
        if (subsample_count > 0) {
            for (j=0; j < subsample_count; j++) {
                if (version == 1)
                {
                    unsigned int (32) subsample_size;
                }
                else
                {
                    unsigned int (16) subsample_size;
                }
                unsigned int (8) subsample_priority;
                unsigned int (8) discardable;
                unsigned int (32) codec_specific_parameters;
            }
        }
    }
}
```

---

Semantics version is an integer that specifies the version of this box (0 or 1 in this document)

entry_count is an integer that gives the number of entries in the following table.

sample_delta is an integer that indicates the sample having sub-sample structure. It is coded as the difference, in decoding order, between the desired sample number, and the sample number indicated in the previous entry. If the current entry is the first entry in the track, the value indicates the sample number of the first sample having sub-sample information, that is, the value is the difference between the sample number and zero (0). If the current entry is the first entry in a track fragment with preceding non-empty track fragments, the value indicates the difference between the sample number of the first sample having sub-sample information and the sample number of the last sample in the previous track fragment. If the current entry is the first entry in a track fragment without any preceding track fragments, the value indicates the sample number of the first sample having sub-sample information, that is, the value is the difference between the sample number and zero (0). This implies that the sample_delta for the first entry describing the first sample in the track or in the track fragment is always 1.

subsample_count is an integer that specifies the number of sub-sample for the current sample. If there is no sub-sample structure, then this field takes the value 0.

subsample_size is an integer that specifies the size, in bytes, of the current sub-sample.

subsample_priority is an integer specifying the degradation priority for each sub-sample. Higher values of subsample_priority, indicate sub-samples which are important to, and have a greater impact on, the decoded quality.

discardable equal to 0 means that the sub-sample is required to decode the current sample, while equal to 1 means the sub-sample is not required to decode the current sample but may be used for enhancements, e.g., the sub-sample consists of supplemental enhancement information (SEI) messages.

codec_specific_parameters is defined by the codec in use. If no such definition is available, this field shall be set to 0.

What is claimed is:

1. A method to store a multi-plane image (MPI) scene according to a High Efficiency Image File (HEIF) file container, the method comprising:
   generating an MPI image comprising two or more image layers, wherein each image layer comprises texture information and opacity information;
   packing the texture information layers to generate a 2D texture image;
   packing the opacity information layers to generate a 2D opacity image;
   packing the 2D texture image and the 2D opacity image to generate a packed image according to an image packing format;
   coding the packed image to generate a coded MPI image;
   generating MPI metadata for the coded MPI image; and
   combining the coded MPI image and the MPI metadata according to syntax semantics of the HEIF file container to generate a file-representation of the MPI image, wherein a coded media representation of the coded MPI image and the MPI metadata conforms to a visual volumetric video-based coding (V3C) specification.

2. The method of claim 1, wherein the MPI metadata comprise one or more of:
   the number of the two or more image layers in the MPI image;
   a description of the packing format; and
   depth information for the image layers in the MPI image.

3. A non-transitory computer-readable storage medium having stored thereon computer-executable instructions for executing with one or more processors a method in accordance with claim 1.

4. An apparatus comprising a processor and configured to perform the method recited in claim 1.

5. The method of claim 1, wherein in the HEIF file:
   a presence of V3C items is indicated by a MetaBox of type "volv";

a meta box comprises a V3C configuration item property, a 2D video decoder configuration item property, and a sub-sample item property; and an mdat box comprises a V3C item representing a single visual volumetric video frame of the coded MPI image and associated MPI metadata.

6. The method of claim 5, wherein V3C items are identified by a "v3e1" 4CC code type.

7. The method of claim 6, wherein items of type 'v3e1' can be associated with a V3C configuration item property, a sub-sample item property of type 'subs', and a 2D video decoder configuration item property, such as an HEVC configuration item property with type 'hvcC' or a VVC configuration item property with type 'vvCC'.

8. The method of claim 6, wherein if a PrimaryItemBox box exists, then item_ID in this box is set to indicate a V3C item of type v3e1, and syntax of the v3e1 item comprises:

```
aligned (8) class V3CItemData {
    for (int i=0; i < item_size; ) { // derived from ItemLocationBox
        unsigned int (v3c_config.unit_size_precision_bytes_minus1 + 1) *8)
v3c_unit_size;
        bit (8) ss_v3c_unit [v3c_unit_size] ;
        i += v3c_unit_size + v3c_config.unit_size_precision_bytes_minus1
+ 1;
    }
}
``` wherein, item_size is equal to the sum of the extent-_length values of each extent of the item, as specified in the ItemLocationBox, v3c_config indicates the record in the associated V3CConfigurationProperty, v3c_unit_size specifies the size, in bytes, of the ss_v3c_unit array, wherein this size is equivalent to the sample stream V3C unit size ssnu_v3c_unit_size as defined in ISO/IEC 23090-5, Annex C, and ss_v3c_unit contains a single V3C unit in V3C unit sample stream format as defined in ISO/IEC 23090-5: 2021, Annex C.

9. The method of claim 5, wherein the V3C configuration item property has a box type of 'v3cC' with syntax:

```
aligned (8) class V3CConfigurationProperty
extends ItemProperty ( 'v3cC', version=0, flags) {
    V3CDecoderConfigurationRecord v3c_config (version) ;
} ,
``` wherein v3c_config includes a single instance of V3CDecoderConfigurationRecord which provides V3C bitstream's decoding specific information.

10. The method of claim 5, wherein the sub-sample item property has a box type of 'subs'.

11. The method of claim 5, wherein coding is performed according to HEVC, and combining the packed image and the MPI metadata according to an HEIF representation of a single MPI image comprises:

```
FileTypeBox 'ftyp' :major-brand='heic', compatible-brands='heic'
MetaBox 'meta':
    HandlerBox 'hdlr': 'volv'
    PrimaryItemBox 'pitm': item_ID=1;
    ItemInfoBox 'iinf': entry_count=1
        1) 'infe': item_ID=1, item_type='v3e1';
    ItemLocationBox 'iloc': item_count=1
        item_ID=1, extent_count=1, extent_offset=X,
extent_length=Y;
    ItemPropertiesBox 'iprp':
        ItemPropertyContainerBox 'ipco':
            'v3cC'
            'hvcC'
            'subs'
        ItemPropertyAssociation 'ipma': entry_count=1
            1) item_ID=1, association_count=3,
                essential=1, property_index=1;
                essential=1, property_index=2;
                essential=0, property_index=3;
MediaDataBox 'mdat' or 'idat':
    HEVC Image (at file offset X, with length Y).
```

12. The method of claim 5, further comprising:

decoding the HEIF file of the coded MPI image with a player, wherein the decoding comprises:

determining whether all essential properties of the HEIF file are supported by the player, and if true, then:

parsing the HEIF file to extract the MPI coded image and the MPI metadata of the MPI image;

decoding and unpacking the coded MPI image to generate the texture image and the opacity image; and given a user viewport generate an output image based on the MPI metadata, the texture image, the opacity image, and the user viewport.

* * * * *